US012403623B2

(12) United States Patent
Akbarian-Tefaghi et al.

(10) Patent No.: US 12,403,623 B2
(45) Date of Patent: Sep. 2, 2025

(54) WOOD FIBER-GLASS COMPOSITE

(71) Applicant: Owens Corning Intellectual Capital, LLC, Toledo, OH (US)

(72) Inventors: Sara Akbarian-Tefaghi, New Albany, OH (US); Robert O'Leary, Newark, OH (US); Colleen N. Kennedy, Newport, RI (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 18/767,036

(22) Filed: Jul. 9, 2024

(65) Prior Publication Data

US 2024/0367340 A1 Nov. 7, 2024

Related U.S. Application Data

(62) Division of application No. 17/430,777, filed as application No. PCT/US2020/018334 on Feb. 14, 2020, now Pat. No. 12,053,904.

(60) Provisional application No. 62/938,383, filed on Nov. 21, 2019, provisional application No. 62/806,333, filed on Feb. 15, 2019.

(51) Int. Cl.

| | |
|---|---|
| ***B27N 3/04*** | (2006.01) |
| ***B27N 1/02*** | (2006.01) |
| ***B27N 3/00*** | (2006.01) |
| ***B27N 3/20*** | (2006.01) |

(52) U.S. Cl.

CPC ................. *B27N 3/04* (2013.01); *B27N 1/02* (2013.01); *B27N 3/002* (2013.01); *B27N 3/007* (2013.01); *B27N 3/203* (2013.01)

(58) Field of Classification Search

None

See application file for complete search history.

(56) References Cited

U.S. PATENT DOCUMENTS

| | | | |
|---|---|---|---|
| 3,004,878 | A | 10/1961 | Tomlinson |
| 3,231,458 | A | 1/1966 | Lawson |
| 4,058,580 | A | 11/1977 | Flanders |
| 4,210,692 | A | 7/1980 | Bohme et al. |
| 4,379,808 | A | 4/1983 | Cole et al. |
| 4,987,022 | A | 1/1991 | Ueno |
| 5,236,757 | A | 8/1993 | Probst et al. |
| 5,545,450 | A | 8/1996 | Andersen et al. |
| 5,635,125 | A | 6/1997 | Ternes et al. |
| 5,985,429 | A | 11/1999 | Plummer et al. |
| 6,265,037 | B1 | 7/2001 | Godavarti et al. |
| 6,268,042 | B1 | 7/2001 | Baig |
| 6,281,148 | B1 | 8/2001 | Dagher et al. |
| 6,497,937 | B1 | 12/2002 | Lam et al. |
| 6,929,841 | B1 | 8/2005 | Van Dijk et al. |
| 7,687,410 | B2 | 3/2010 | Tang |
| 7,743,567 | B1 | 6/2010 | Buhrts |
| 8,661,705 | B2 | 3/2014 | Hackl et al. |
| 8,852,488 | B2 | 10/2014 | Sain et al. |
| 9,909,044 | B2 | 3/2018 | Parker et al. |
| 10,087,350 | B2 | 10/2018 | Zhang et al. |
| 2003/0187102 | A1 | 10/2003 | Medoff et al. |
| 2004/0048055 | A1 | 3/2004 | Branca |
| 2005/0238865 | A1 | 10/2005 | Konishi |
| 2005/0242459 | A1 * | 11/2005 | Savino .................. B27N 3/083 264/109 |
| 2006/0127659 | A1 | 6/2006 | Stutz et al. |
| 2006/0275600 | A1 | 12/2006 | Vavra et al. |
| 2007/0141316 | A1 | 6/2007 | Mcgrath et al. |
| 2010/0209306 | A1 | 8/2010 | Kunze et al. |
| 2010/0304081 | A1 | 12/2010 | Dagher et al. |
| 2010/0310893 | A1 | 12/2010 | Derbyshire et al. |
| 2011/0271625 | A1 | 11/2011 | Clark et al. |
| 2015/0165735 | A1 | 6/2015 | Joung |
| 2015/0184395 | A1 | 7/2015 | Battis et al. |
| 2015/0298347 | A1 | 10/2015 | Joung et al. |
| 2017/0120473 | A1 | 5/2017 | Zhang et al. |
| 2017/0233288 | A1 | 8/2017 | Wall et al. |
| 2017/0334784 | A1 | 11/2017 | Brooks et al. |
| 2018/0340104 | A1 | 11/2018 | Hampson et al. |

FOREIGN PATENT DOCUMENTS

| | | | |
|---|---|---|---|
| EP | 2025484 | B1 | 2/2011 |
| EP | 2319671 | B1 | 3/2014 |
| EP | 2397291 | B1 | 9/2016 |
| EP | 2939807 | B1 | 2/2017 |
| WO | 2017072184 | A1 | 5/2017 |

OTHER PUBLICATIONS

International Search Report and Written Opinion from PCT/US2020/018334 dated Jul. 6, 2020.
Office Action from U.S. Appl. No. 17/430,777 dated Dec. 22, 2023.
Notice of Allowance from U.S. Appl. No. 17/430,777 dated Apr. 10, 2024.
Office Action from EP Application No. 20714029.4 dated Apr. 2, 2025.

* cited by examiner

*Primary Examiner* — Sheeba Ahmed

(74) *Attorney, Agent, or Firm* — Calfee, Halter & Griswold LLP

(57) ABSTRACT

The general inventive concepts relate to engineered wood products. The engineered wood products demonstrate improved properties including acoustic damping, fire resistance, and water absorption relative to similar engineered wood products that comprise only a single source of fibers. In contrast, the inventive engineered wood products include a combination of at least two types of fibers.

14 Claims, 38 Drawing Sheets

| | | 0.75" Shredded dry | 0.5" Shredded dry | 0.25" Shredded dry | 0.75" Shredded wet | 0.5" Shredded wet | Dust emitted from shredding |
|---|---|---|---|---|---|---|---|
| Mean diameter (µm) | = | 24.25 | 23.97 | 21.36 | 34.55 | 23.88 | 23.94 |
| Std. deviation (µm) | = | 3.27 | 2.67 | 5.52 | 14.81 | 4.03 | 2.92 |
| Maximum diameter (µm) | = | 37.44 | 34.84 | 38.32 | 110.27 | 65.05 | 34.43 |
| Minimum diameter (µm) | = | 17.99 | 17.32 | 8.82 | 19.20 | 4.98 | 15.27 |
| Minimum Length (µm) | = | 36.22 | 32.40 | 26.61 | 40.34 | 30.37 | 30.61 |
| | | | | | | | |
| | | Percentage | Percentage | Percentage | Percentage | Percentage | Percentage |
| | 0 | 0.0 | 0.0 | 0.0 | 0.0 | 0.0 | 0.0 |
| | 1 | 0.0 | 0.0 | 0.0 | 0.0 | 0.0 | 0.0 |
| | 2 | 0.0 | 0.0 | 0.0 | 0.0 | 0.0 | 0.0 |
| | 3 | 0.0 | 0.0 | 0.0 | 0.0 | 0.0 | 0.0 |
| | 4 | 0.0 | 0.0 | 0.0 | 0.0 | 0.0 | 0.0 |
| | 5 | 0.0 | 0.0 | 0.0 | 0.0 | 0.0 | 0.0 |
| | 6 | 0.0 | 0.0 | 0.0 | 0.0 | 0.0 | 0.0 |
| | 7 | 0.0 | 0.0 | 0.0 | 0.0 | 0.0 | 0.0 |
| | 8 | 0.0 | 0.0 | 0.5 | 0.0 | 0.0 | 0.0 |
| | 9 | 0.0 | 0.0 | 2.3 | 0.0 | 0.0 | 0.0 |
| | 10 | 0.0 | 0.0 | 4.2 | 0.0 | 0.0 | 0.0 |

(A)

FIG. 10

A

| Diameter in Microns (µm) | | | | | | |
|---|---|---|---|---|---|---|
| 11 | 0.0 | 0.0 | 3.3 | 0.0 | 0.0 | 0.0 |
| 12 | 0.0 | 0.0 | 1.4 | 0.0 | 0.0 | 0.0 |
| 13 | 0.0 | 0.0 | 5.6 | 0.0 | 0.0 | 0.0 |
| 14 | 0.0 | 0.0 | 2.3 | 0.0 | 0.0 | 0.0 |
| 15 | 0.0 | 0.0 | 0.9 | 0.0 | 0.0 | 0.5 |
| 16 | 0.0 | 0.0 | 0.9 | 0.0 | 0.0 | 0.0 |
| 17 | 0.5 | 0.5 | 0.0 | 0.0 | 0.0 | 0.5 |
| 18 | 0.0 | 0.5 | 1.9 | 0.0 | 0.0 | 1.5 |
| 19 | 1.9 | 2.0 | 1.9 | 0.5 | 0.5 | 1.9 |
| 20 | 4.7 | 7.4 | 3.7 | 2.5 | 2.7 | 6.3 |
| 21 | 12.3 | 10.9 | 12.6 | 1.5 | 1.6 | 13.1 |
| 22 | 16.1 | 15.3 | 13.1 | 11.4 | 12.3 | 15.0 |
| 23 | 25.1 | 23.3 | 17.3 | 4.0 | 4.3 | 18.0 |
| 24 | 15.2 | 12.4 | 10.3 | 6.0 | 6.4 | 13.6 |
| 25 | 6.6 | 11.4 | 5.6 | 2.5 | 2.7 | 13.1 |
| 26 | 4.7 | 4.0 | 3.7 | 1.5 | 1.6 | 6.8 |
| 27 | 2.8 | 4.0 | 0.9 | 1.0 | 1.1 | 1.9 |
| 28 | 1.4 | 3.5 | 0.5 | 3.0 | 3.2 | 1.5 |
| 29 | 0.0 | 1.5 | 2.8 | 4.5 | 4.8 | 0.5 |

B

FIG. 10 (Continued)

B

| | | | | | | |
|---|---|---|---|---|---|---|
| 30 | 1.9 | 1.5 | 1.4 | 3.5 | 3.7 | 2.4 |
| 31 | 1.4 | 0.5 | 0.9 | 7.0 | 7.5 | 0.5 |
| 32 | 1.4 | 0.5 | 0.9 | 8.5 | 9.1 | 1.5 |
| 33 | 1.4 | 0.5 | 0.5 | 6.0 | 6.4 | 0.5 |
| 34 | 0.9 | 0.5 | 0.0 | 7.5 | 8.0 | 1.0 |
| 35 | 0.0 | 0.0 | 0.0 | 4.5 | 4.8 | 0.0 |
| 36 | 0.5 | 0.0 | 0.0 | 6.5 | 7.0 | 0.0 |
| 37 | 0.0 | 0.0 | 0.0 | 4.5 | 4.8 | 0.0 |
| 38 | 0.0 | 0.0 | 0.0 | 1.0 | 1.1 | 0.0 |
| 39 | 0.0 | 0.0 | 0.0 | 1.5 | 1.6 | 0.0 |
| 40 | 0.0 | 0.0 | 0.5 | 0.5 | 0.5 | 0.0 |
| >40 | 0.9 | 0.0 | 0.0 | 10.9 | 4.3 | 0.0 |
| Total (%) | 100.0 | 100.0 | 100.0 | 100.0 | 100.0 | 100.0 |

FIG. 10 (Continued)

(a)

| SAMPLE | | 0.75" Shredded dry | 0.5" Shredded dry | 0.25" Shredded dry | 0.75" Shredded wet | 0.5" Shredded wet | Dust emitted from shredding |
|---|---|---|---|---|---|---|---|
| | | | | | | | |
| Mean Length in Microns (N=400) | | 1816 | 1692 | 1475 | 5514 | 1590 | 331 |
| 1SD | | 2599 | 2221 | 1590 | 4221 | 2023 | 245 |
| | | | | | | | |
| Median Length in Microns (N=400) | | 533 | 561 | 700 | 5078 | 522 | 263 |
| | | | | | | | |
| Minimum Length in Microns | | 103 | 130 | 112 | 104 | 80 | 55 |
| Maximum Length in Microns | | 14861 | 10725 | 7969 | 23504 | 8765 | 2750 |
| | | | | | | | |
| | | | | | | | |
| BIN | | % Present | % Present | % Present | % Present | % Present | % Present |
| 0 to 500 μm | | 48 | 43.75 | 38.5 | 18.25 | 48.25 | 84 |
| 500 to 1000 μm | | 16.25 | 24 | 23.75 | 5.25 | 17.5 | 14.25 |
| 1000 to 1500 μm | | 6 | 4.75 | 6.75 | 0.5 | 5.5 | 1 |
| 1500 to 2000 μm | | 4.25 | 1.75 | 5 | 0.5 | 3.25 | 0.5 |
| 2000 to 2500 μm | | 2.25 | 1.25 | 2.25 | 0.75 | 1 | 0 |
| 2500 to 3000 μm | | 1.25 | 0.25 | 2.5 | 2 | 2 | 0.25 |
| 3000 to 3500 μm | | 3 | 3 | 5.5 | 2.25 | 3.25 | 0 |
| 3500 to 4000 μm | | 2.25 | 3.5 | 5.25 | 5.75 | 3 | 0 |
| 4000 to 4500 μm | | 2.25 | 4 | 4.25 | 6.25 | 2.75 | 0 |
| 4500 to 5000 μm | | 2.25 | 3.25 | 2.5 | 8 | 2.5 | 0 |
| 5000 to 5500 μm | | 1.5 | 3 | 1.25 | 4.75 | 4 | 0 |
| 5500 to 6000 μm | | 1 | 1.75 | 1.25 | 4 | 2 | 0 |
| 6000 to 6500 μm | | 1.75 | 1.25 | 0.25 | 5 | 2 | 0 |
| 6500 to 7000 μm | | 1.25 | 0.5 | 0.5 | 4.5 | 0.75 | 0 |
| 7000 to 7500 μm | | 1.25 | 1 | 0.25 | 3 | 0.75 | 0 |
| 7500 to 8000 μm | | 1.25 | 0 | 0.25 | 4 | 0.5 | 0 |
| 8000 to 8500 μm | | 1 | 1 | 0 | 5 | 0.5 | 0 |
| 8500 to 9000 μm | | 0.25 | 0.75 | 0 | 1.75 | 0.5 | 0 |
| 9000 to 9500 μm | | 1 | 0.25 | 0 | 3.5 | 0 | 0 |

(A)

FIG. 11

A (a)

| | | | | | | | |
|---|---|---|---|---|---|---|---|
| 9500 to 10000 μm | | 0 | 0.25 | 0 | 2.5 | 0 | 0 |
| 10000 to 10500 μm | | 0.25 | 0.5 | 0 | 1.25 | 0 | 0 |
| 10500 to 11000 μm | | 0.5 | 0.25 | 0 | 1.5 | 0 | 0 |
| 11000 to 11500 μm | | 0.5 | 0 | 0 | 0.25 | 0 | 0 |
| 11500 to 12000 μm | | 0.25 | 0 | 0 | 1.5 | 0 | 0 |
| 12000 to 12500 μm | | 0 | 0 | 0 | 1.5 | 0 | 0 |
| 12500 to 13000 μm | | 0.25 | 0 | 0 | 2 | 0 | 0 |
| 13000 to 13500 μm | | 0 | 0 | 0 | 0.5 | 0 | 0 |
| 13500 to 14000 μm | | 0 | 0 | 0 | 0.5 | 0 | 0 |
| 14000 to 14500 μm | | 0 | 0 | 0 | 0.5 | 0 | 0 |
| 14500 to 15000 μm | | 0.25 | 0 | 0 | 0.75 | 0 | 0 |
| 15000 to 15500 μm | | 0 | 0 | 0 | 0.5 | 0 | 0 |
| 15500 to 16000 μm | | 0 | 0 | 0 | 0 | 0 | 0 |
| 16000 to 16500 μm | | 0 | 0 | 0 | 0.25 | 0 | 0 |
| 16500 to 17000 μm | | 0 | 0 | 0 | 0 | 0 | 0 |
| 17000 to 17500 μm | | 0 | 0 | 0 | 0.25 | 0 | 0 |
| 17500 to 18000 μm | | 0 | 0 | 0 | 0.25 | 0 | 0 |
| 18000 to 18500 μm | | 0 | 0 | 0 | 0 | 0 | 0 |
| 18500 to 19000 μm | | 0 | 0 | 0 | 0.25 | 0 | 0 |
| 19000 to 19500 μm | | 0 | 0 | 0 | 0 | 0 | 0 |
| 19500 to 20000 μm | | 0 | 0 | 0 | 0 | 0 | 0 |
| 20000 to 20500 μm | | 0 | 0 | 0 | 0 | 0 | 0 |
| 20500 to 21000 μm | | 0 | 0 | 0 | 0.25 | 0 | 0 |
| 21000 to 21500 μm | | 0 | 0 | 0 | 0 | 0 | 0 |
| 21500 to 22000 μm | | 0 | 0 | 0 | 0 | 0 | 0 |
| 22000 to 22500 μm | | 0 | 0 | 0 | 0.25 | 0 | 0 |
| 22500 to 23000 μm | | 0 | 0 | 0 | 0 | 0 | 0 |
| 23000 to 23500 μm | | 0 | 0 | 0 | 0 | 1 | 0 |
| 23500 to 24000 μm | | 0 | 0 | 0 | 0.25 | 0 | 0 |
| 24000 to 24500 μm | | 0 | 0 | 0 | 0 | 0 | 0 |
| 24500 to 25000 μm | | 0 | 0 | 0 | 0 | 0 | 0 |
| | | | | | | | |
| | | | | | | | |
| | | 100 | 100 | 100 | 100 | 100 | 100 |

FIG. 11 (Continued)

(b)

| | | | | | | | |
|---|---|---|---|---|---|---|---|
| Mean Length (µm) | = | 59.58 | 65.85 | 57.62 | 76.38 | 46.16 | 23.94 |
| Std. deviation (µm) | = | 17.99 | 22.20 | 19.75 | 23.58 | 10.75 | 2.92 |
| Maximum Length (µm) | = | 106.56 | 110.30 | 92.39 | 130.79 | 72.65 | 34.43 |
| Minimum Length (µm) | = | 36.22 | 32.40 | 26.61 | 40.34 | 30.37 | 30.61 |

FIG. 11 (Continued)

| | | S1 - Gastonia veil | S2 - Shred Apple | S3 - CSB Dust | S4 - Insul Fiber Waste |
|---|---|---|---|---|---|
| Mean diameter (µm) | = | 11.25 | 11.47 | 53.15 | 23.92 |
| Std. deviation (µm) | = | 0.92 | 1.50 | 39.98 | 29.60 |
| Maximum diameter (µm) | = | 13.34 | 14.89 | 302.26 | 188.68 |
| Minimum diameter (µm) | = | 8.77 | 3.61 | 5.94 | 1.37 |
| | | | | | |
| | | Percentage | Percentage | Percentage | Percentage |
| Diameter in Microns (µm) | <1 | 0.0 | 0.0 | 0.0 | 0.0 |
| | 1 to 2 | 0.0 | 0.0 | 0.0 | 1.1 |
| | 2 to 3 | 0.0 | 0.0 | 0.0 | 4.3 |
| | 3 to 4 | 0.0 | 0.9 | 0.0 | 7.6 |
| | 4 to 5 | 0.0 | 0.9 | 0.0 | 6.5 |
| | 5 to 6 | 0.0 | 0.0 | 1.6 | 7.6 |
| | 6 to 7 | 0.0 | 0.0 | 0.0 | 11.4 |
| | 7 to 8 | 0.0 | 0.0 | 0.0 | 6.5 |
| | 8 to 9 | 1.0 | 0.9 | 0.0 | 6.0 |
| | 9 to 10 | 10.6 | 0.9 | 1.6 | 3.8 |
| | 10 to 11 | 24.0 | 26.2 | 0.0 | 2.7 |
| | 11 to 12 | 43.3 | 40.2 | 1.6 | 1.1 |
| | 12 to 13 | 16.3 | 17.8 | 3.1 | 2.2 |
| | 13 to 14 | 4.8 | 8.4 | 4.7 | 1.6 |
| | 14 to 15 | 0.0 | 3.7 | 3.1 | 1.6 |
| | 15 to 16 | 0.0 | 0.0 | 6.3 | 1.1 |
| | 16 to 17 | 0.0 | 0.0 | 4.7 | 2.2 |
| | 17 to 18 | 0.0 | 0.0 | 3.1 | 2.2 |
| | 18 to 19 | 0.0 | 0.0 | 6.3 | 1.6 |
| | 19 to 20 | 0.0 | 0.0 | 3.1 | 0.0 |
| | 20 to 21 | 0.0 | 0.0 | 3.1 | 1.6 |
| | 21 to 22 | 0.0 | 0.0 | 4.7 | 1.1 |
| | 22 to 23 | 0.0 | 0.0 | 7.8 | 1.1 |
| | 23 to 24 | 0.0 | 0.0 | 4.7 | 1.1 |
| | 24 to 25 | 0.0 | 0.0 | 0.0 | 1.6 |
| | >25 | 0.0 | 0.0 | 40.6 | 22.3 |
| | Total (%) | 100.0 | 100.0 | 100.0 | 100.0 |

A

FIG. 12

| S5 - Screeners Waste | S6 - Wash Water Waste | S7 - 5 Mic ULF | S8 - 11 Mic D ULF | S9 - Thick ULF | S10 - UltraBatt Min Wool |
|---|---|---|---|---|---|
| 12.94 | 14.03 | 4.48 | 13.09 | 34.58 | 4.68 |
| 2.29 | 2.38 | 2.19 | 3.26 | 9.03 | 5.10 |
| 18.36 | 19.58 | 13.04 | 23.95 | 51.38 | 40.09 |
| 7.72 | 7.89 | 0.94 | 1.61 | 2.74 | 0.66 |
| | | | | | |
| Percentage | Percentage | Percentage | Percentage | Percentage | Percentage |
| 0.0 | 0.0 | 1.0 | 0.0 | 0.0 | 4.7 |
| 0.0 | 0.0 | 4.9 | 1.9 | 0.0 | 14.0 |
| 0.0 | 0.0 | 18.6 | 0.0 | 0.9 | 24.3 |
| 0.0 | 0.0 | 23.5 | 0.0 | 0.9 | 14.0 |
| 0.0 | 0.0 | 16.7 | 0.0 | 0.0 | 15.0 |
| 0.0 | 0.0 | 16.7 | 1.9 | 0.0 | 10.3 |
| 0.0 | 0.0 | 9.8 | 1.9 | 0.0 | 5.6 |
| 0.9 | 1.0 | 3.9 | 2.9 | 1.8 | 3.7 |
| 0.0 | 0.0 | 1.0 | 3.8 | 0.0 | 0.9 |
| 8.4 | 5.7 | 0.0 | 0.0 | 0.0 | 0.9 |
| 17.8 | 4.8 | 1.0 | 1.9 | 0.9 | 1.9 |
| 9.3 | 2.9 | 1.0 | 7.6 | 0.9 | 0.9 |
| 10.3 | 17.1 | 1.0 | 12.4 | 0.0 | 0.0 |
| 19.6 | 22.9 | 1.0 | 26.7 | 0.0 | 0.9 |
| 16.8 | 18.1 | 0.0 | 22.9 | 0.0 | 0.0 |
| 7.5 | 6.7 | 0.0 | 9.5 | 0.0 | 0.9 |
| 3.7 | 8.6 | 0.0 | 3.8 | 0.0 | 0.0 |
| 3.7 | 6.7 | 0.0 | 0.0 | 0.9 | 0.0 |
| 1.9 | 2.9 | 0.0 | 0.0 | 0.0 | 0.0 |
| 0.0 | 2.9 | 0.0 | 0.0 | 0.9 | 0.0 |
| 0.0 | 0.0 | 0.0 | 0.0 | 0.0 | 0.0 |
| 0.0 | 0.0 | 0.0 | 1.9 | 0.9 | 0.0 |
| 0.0 | 0.0 | 0.0 | 0.0 | 0.0 | 0.0 |
| 0.0 | 0.0 | 0.0 | 1.0 | 0.0 | 0.0 |
| 0.0 | 0.0 | 0.0 | 0.0 | 0.0 | 0.0 |
| 0.0 | 0.0 | 0.0 | 0.0 | 92.0 | 1.9 |
| 100.0 | 100.0 | 100.0 | 100.0 | 100.0 | 100.0 |

(A)

FIG. 12 (Continued)

| SAMPLE | 0.5" shredded Gastonia veil | 0.5" shredded Apeldoorn veil | Milled Composite wet | | Screeners waste | Wash water waste | 30-micron insulation glass |
|---|---|---|---|---|---|---|---|
| | | | | | | | |
| Mean Length in Microns (N=400) | 391 | 424 | 291 | Mean Length in Microns (N=400) | 3871 | 3936 | 6230 |
| 1SD | 253 | 295 | 144 | 1SD | 452 | 477 | 2804 |
| | | | | | | | |
| Median length Microns (N=400) | 312 | 344 | 259 | Median Length in Microns (N=400) | 3892 | 3951 | 5622 |
| | | | | | | | |
| Minimum Length in Microns | 61 | 89 | 106 | Minimum Length in Microns | 2325 | 1568 | 1863 |
| Maximum Length in Microns | 1542 | 2445 | 1470 | Maximum Length in Microns | 5218 | 5105 | 20648 |
| | | | | | | | |
| | | | | | | | |
| **BIN** | **% Present** | **% Present** | **% Present** | **BIN** | **% Present** | **% Present** | **% Present** |
| 0 to 100 μm | 2 | 0.25 | 0 | 0 to 500 μm | 0 | 0 | 0 |
| 100 to 200 μm | 20 | 17 | 25.25 | 500 to 1000 μm | 0 | 0 | 0 |
| 200 to 300 μm | 25.5 | 23.25 | 38.5 | 1000 to 1500 μm | 0 | 0 | 0 |
| 300 to 400 μm | 15.5 | 21.5 | 21.25 | 1500 to 2000 μm | 0 | 0.25 | 0.5 |
| 400 to 500 μm | 12.25 | 13.25 | 6.5 | 2000 to 2500 μm | 1 | 0.5 | 2.25 |
| 500 to 600 μm | 6.75 | 6 | 4.5 | 2500 to 3000 μm | 2 | 2.5 | 3.75 |
| 600 to 700 μm | 5.75 | 5.5 | 2.5 | 3000 to 3500 μm | 15.5 | 13.75 | 5 |
| 700 to 800 μm | 4.75 | 3.75 | 0.5 | 3500 to 4000 μm | 42.5 | 38 | 6.25 |

A

FIG. 13

(A)

| | | | | | | | | | |
|---|---|---|---|---|---|---|---|---|---|
| 800 to 900 μm | | 2.25 | 3 | 0.25 | 4000 to 4500 μm | | 31.25 | 34 | 8.5 |
| 900 to 1000 μm | | 1.75 | 2 | 0.5 | 4500 to 5000 μm | | 7.25 | 10 | 10.5 |
| 1000 to 1100 μm | | 2.25 | 1.5 | 0 | 5000 to 5500 μm | | 0.5 | 1 | 11.25 |
| 1100 to 1200 μm | | 0 | 0.75 | 0 | 5500 to 6000 μm | | 0 | 0 | 9.25 |
| 1200 to 1300 μm | | 0.5 | 0.25 | 0 | 6000 to 6500 μm | | 0 | 0 | 7 |
| 1300 to 1400 μm | | 0 | 0.25 | 0 | 6500 to 7000 μm | | 0 | 0 | 7 |
| 1400 to 1500 μm | | 0.5 | 0.25 | 0.25 | 7000 to 7500 μm | | 0 | 0 | 4.75 |
| 1500 to 1600 μm | | 0.25 | 0.25 | 0 | 7500 to 8000 μm | | 0 | 0 | 5.25 |
| 1600 to 1700 μm | | 0 | 0.5 | 0 | 8000 to 8500 μm | | 0 | 0 | 2.5 |
| 1700 to 1800 μm | | 0 | 0 | 0 | 8500 to 9000 μm | | 0 | 0 | 3.25 |
| 1800 to 1900 μm | | 0 | 0.5 | 0 | 9000 to 9500 μm | | 0 | 0 | 2.75 |
| 1900 to 2000 μm | | 0 | 0 | 0 | 9500 to 10000 μm | | 0 | 0 | 2 |
| 2000 to 2100 μm | | 0 | 0 | 0 | 10000 to 10500 μm | | 0 | 0 | 1.5 |
| 2100 to 2200 μm | | 0 | 0.0 | 0 | 10500 to 11000 μm | | 0 | 0 | 0.5 |
| 2200 to 2300 μm | | 0 | 0.0 | 0 | 11000 to 11500 μm | | 0 | 0 | 0.75 |
| 2300 to 2400 μm | | 0 | 0.0 | 0 | 11500 to 12000 μm | | 0 | 0 | 1.5 |
| 2400 to 2500 μm | | 0 | 0.3 | 0 | 12000 to 12500 μm | | 0 | 0 | 0 |
| | | | | | 12500 to 13000 μm | | 0 | 0 | 0.25 |
| **Total Percent** | | **100.0** | **100.0** | **100.0** | 13000 to 13500 μm | | 0 | 0 | 1 |
| | | | | | 13500 to 14000 μm | | 0 | 0 | 0.25 |
| | | | | | 14000 to 14500 μm | | 0 | 0 | 0.75 |

(B)

FIG. 13 (Continued)

B

| | | | | | | | | | |
|---|---|---|---|---|---|---|---|---|---|
| | | | | | 14500 to 15000 µm | | 0 | 0 | 0.25 |
| | | | | | 15000 to 15500 µm | | 0 | 0 | 0.5 |
| | | | | | 15500 to 16000 µm | | 0 | 0 | 0 |
| | | | | | 16000 to 16500 µm | | 0 | 0 | 0 |
| | | | | | 16500 to 17000 µm | | 0 | 0 | 0 |
| | | | | | 17000 to 17500 µm | | 0 | 0 | 0.25 |
| | | | | | 17500 to 18000 µm | | 0 | 0 | 0.25 |
| | | | | | 18000 to 18500 µm | | 0 | 0 | 0 |
| | | | | | 18500 to 19000 µm | | 0 | 0 | 0 |
| | | | | | 19000 to 19500 µm | | 0 | 0 | 0 |
| | | | | | 19500 to 20000 µm | | 0 | 0 | 0 |
| | | | | | 20000 to 20500 µm | | 0 | 0 | 0.25 |
| | | | | | 20500 to 21000 µm | | 0 | 0 | 0.25 |
| | | | | | 21000 to 21500 µm | | 0 | 0 | 0 |
| | | | | | 21500 to 22000 µm | | 0 | 0 | 0 |
| | | | | | 22000 to 22500 µm | | 0 | 0 | 0 |
| | | | | | 22500 to 23000 µm | | 0 | 0 | 0 |
| | | | | | | | | | |
| | | | | | **Total:** | | **100** | **100** | **100** |

FIG. 13 (Continued)

WOOD FIBER-GLASS COMPOSITE

CROSS-REFERENCE TO RELATED APPLICATIONS

This application is a divisional of U.S. patent application Ser. No. 17/430,777, filed on Aug. 13, 2021, which is the U.S. national stage entry of PCT/US2020/018334, filed on Feb. 14, 2020, which claims priority to and any benefit of U.S. Provisional Patent Application No. 62/806,333, filed Feb. 15, 2019, and U.S. Provisional Patent Application No. 62/938,383, filed Nov. 21, 2019, the entire contents of which are incorporated herein by reference.

TECHNICAL FIELD

The general inventive concepts relate to fibrous composite materials and more particularly to engineered wood products made from the combination of wood fibers and glass.

BACKGROUND

Engineered wood products, also called composite wood products, or manufactured board, include a range of derivative wood products which are manufactured by binding or fixing the strands, particles, fibers, or veneers or boards of wood, together with resins or adhesives to form composite materials. These products are engineered to particular design specifications based on the intended use. Engineered wood products are used in a variety of applications, including home construction, furniture, commercial buildings, and industrial products, among others.

Typically, engineered wood products are made from the same hardwoods and softwoods used to produce lumber. Sawmill scraps and other wood waste can be used for engineered wood products composed of wood particles or fibers such as plywood, medium density fiberboard (MDF), high density fiberboard (HDF), particle board, or oriented strand board (OSB). These products can often be categorized by the size of the wood scrap particles that are used in their production.

Engineered wood products have found use in a variety of building applications. These products are made by breaking down hardwood or softwood residuals into wood fibers, combining it with wax and a resin binder, and forming panels by applying high temperature and pressure. MDF and HDF are generally denser than plywood and particle board. They are made up of separated fibers, but can be used as a building material similar in application to plywood.

The strength of engineered wood products such as MDF and HDF arises from the interaction between the resin and the wood fibers. Generally speaking, increasing the amount of resin provides a stronger engineered wood product. Attempts have been made to form composite engineered wood products by combining the wood fibers with other fibers, but these attempts have often failed for a variety of reasons.

SUMMARY

The general inventive concepts relate to a composite engineered wood product. In certain exemplary embodiments, the general inventive concepts relate to a composite engineered wood product which includes glass fibers in place of a portion of the wood fibers.

The general inventive concepts may comprise one or more of the following features and/or combinations thereof.

An engineered wood product containing glass fibers distributed throughout. Generally speaking, conventional engineered wood products include only wood fibers as the solid substrate on which the product is based. The engineered wood products according to the general inventive concepts include glass fibers which replace a portion of the wood fibers that would otherwise be present in the engineered wood product. The engineered wood products disclosed herein demonstrate improved properties such as acoustic damping, fire resistance, and/or water absorption relative to similar engineered wood products that include wood as the only source of fibers, with identical resin system and fabrication methods, and without the addition of any other chemicals in either case.

In an exemplary embodiment, the engineered wood product comprises wood fibers, glass fibers and a resin (sometimes called a binder). In certain exemplary embodiments, the engineered wood product is shaped to form a board, sheet, or other common building material.

In an exemplary embodiment, the engineered wood product comprises glass fibers in an amount of 1% to 60% of the total fibrous material in the engineered wood product.

In an exemplary embodiment, the engineered wood product comprises fibrous materials in an amount of 80% to 98% by weight of the engineered wood product and a binder, wherein the fibrous material comprises glass fibers in an amount of 1% to 60% by weight of the fibrous material, and wood fibers.

In an exemplary embodiment, a method of producing an engineered wood product is described. The method comprises: mixing wood fibers and glass fibers, adding a resin to the wood-glass mixture, and allowing the resin to cure.

In an exemplary embodiment, a method of producing an engineered wood product is described. The method comprises: mixing glass fibers, wood fibers, and a resin to form a fibrous mixture; forming the fibrous mixture into a desired shape; and curing the resin to form an engineered wood product.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which:

FIG. 10 shows fiber diameter distribution acquired from scanning electron microscopy (shredded wet and dry composite glass, as well as the dust emitted from the shredding process). The fibers from the samples were photographed on the Hitachi TM3000 scanning electron microscope at 400× and 500× magnification, and the fiber diameters were measured using Scandium software. Method MAL 1.1 was used to measure the distributions. Four hundred fibers were measured for each.

FIG. 11 shows fiber length distribution obtained via optical microscopy (a) and scanning electron microscopy (b), only performed on shredded wet and dry composite glass, with different screen sizes. Last sample is the dust collected on air filter while shredding the glass.

FIG. 12 shows fiber diameter distribution in different types of fiberglass, obtained via scanning electron microscopy.

FIG. 13 shows fiber length distribution of different types of fiberglass, obtained via optical microscopy.

DETAILED DESCRIPTION

Figure 1:
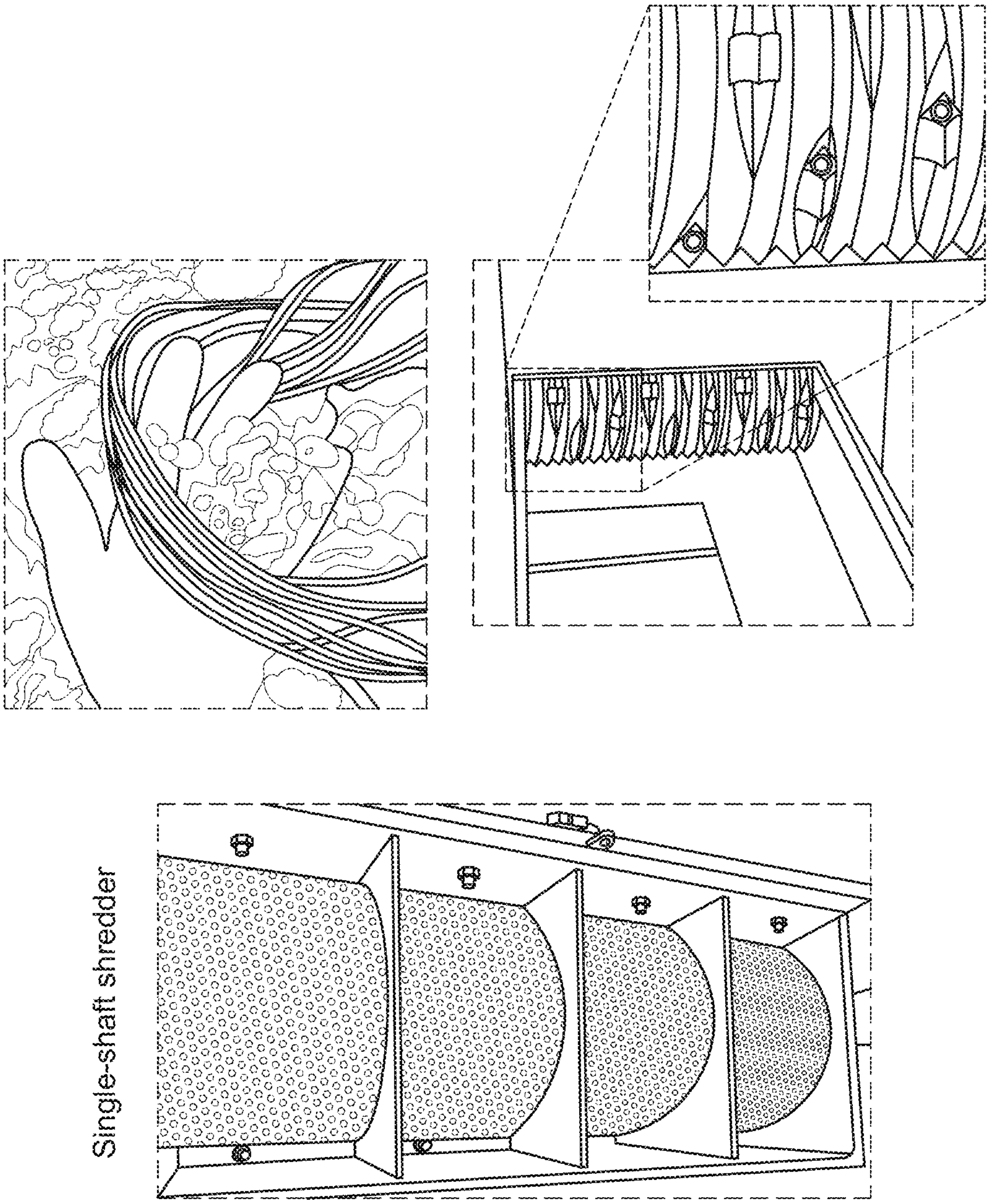
FIG. 1 shows a picture of shredded composite glass for incorporation into an engineered wood product.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

The general inventive concepts are based, at least in part, on the discovery that replacing a portion of the wood fibers in an engineered wood product with glass fibers results in an engineered wood product having unique and unexpected properties. In certain exemplary embodiments, incorporation of glass fibers into an engineered wood product results in a board having improved acoustic damping, fire resistance, and water absorption properties, among others. In addition, Applicants have identified that proper mixing of the components of the fibrous material (i.e., glass fibers and wood fibers) is essential to production of a satisfactory engineered wood board. This includes both the form of the glass (e.g., shredded prior to mixing) and the use of directed/pressurized air in combination with mechanical mixing to improve the effectiveness of the mixing.

The general inventive concepts are not particularly limited to the wood source for production of the engineered wood products discussed herein. Rather, the general inventive concepts contemplate a combination of glass fibers with any of the conventional wood fibers employed in engineered wood products, whether they be hard woods, soft woods, or other classification of wood fiber sources.

As previously mentioned, engineered wood products generally include a resinous binder to provide structure and integrity to the individual wood units. One common resin for use in engineered wood products is 4,4-methylenediphenyl isocyanate (MDI). Two forms of MDI are commonly used as the binder in engineered wood products, pMDI is a polymeric form of MDI and eMDI is an emulsion of MDI, often in water. In certain exemplary embodiments, the engineered wood product includes a MDI binder in an amount of 2% to 7% by weight, including 3% to 5% by weight. In certain exemplary embodiments, the engineered wood product includes a pMDI binder in an amount of 2% to 7% by weight, including 3% to 5% by weight.

In certain exemplary embodiments, the binder is a modified urea-formaldehyde binder (UF). In certain exemplary embodiments, the engineered wood product includes a UF binder in an amount of 5% to 20% by weight. In certain exemplary embodiments, the engineered wood product includes a UF binder in an amount of 5% to 10% by weight. In certain exemplary embodiments, the engineered wood product includes a UF binder in an amount of about 10% by weight.

As the amount of resin in the engineered wood products can range between about 2% and about 20% of the engineered wood product, depending on the type of resin/binder, those of ordinary skill in the art will recognize that the fibrous material (glass fibers and wood fibers) will generally make up about 80% to about 98% by weight of the engineered wood product.

The glass fibers that make up the fibrous material may be made of any suitable raw materials. For example, the glass may be produced from a variety of natural minerals or manufactured chemicals such as silica sand, limestone, and soda ash. Other ingredients may include calcined alumina, borax, feldspar, nepheline syenite, magnesite, and kaolin clay. Methods of forming fibers from the raw glass material (fiberization) is generally known in the art. If the material is a glass fiber, the fibers, once formed, may be pulverized, cut, chopped, milled, or broken into suitable lengths for inclusion in the engineered wood products. In certain embodiments, the glass fibers are shredded prior to inclusion in the engineered wood products. Several devices and methods are available to produce glass fibers of various lengths and are known in the art. In certain exemplary embodiments, the glass fibers are not bundled or otherwise substantially intertwined prior to incorporation into an engineered wood product. One method of improving interaction between the glass fibers and the wood fibers is shredding the glass fibers or otherwise separating fibers into a random or less uniform arrangement (e.g., breaking up bundles or fiber entanglement).

The glass fibers may be discontinuous fibers which are short pieces of fibers primarily used as batts, blankets or boards for insulation. In certain exemplary embodiments, the glass fibers included in the engineered wood products according to the general inventive concepts are selected from insulation fibers, chopped strand fibers, and recycled fibers, among others. In certain exemplary embodiments, the glass fibers are chopped prior to inclusion in the engineered wood products. In certain exemplary embodiments, the glass fibers included in the engineered wood products according to the general inventive concepts are shredded prior to inclusion in the engineered wood products. In certain exemplary embodiments, the glass fibers included in the engineered wood products according to the general inventive concepts are blown open or otherwise separated prior to inclusion in the engineered wood products.

In certain exemplary embodiments, the glass fibers included in the engineered wood products according to the general inventive concepts have an average diameter of less than 350 microns, including 350 to 0.5 microns, including 350 to 3 microns. In certain exemplary embodiments, the glass fibers included in the engineered wood products according to the general inventive concepts have an average diameter of less than 200 microns, including 200 to 0.5 microns. In certain exemplary embodiments, the glass fibers included in the engineered wood products according to the general inventive concepts have an average diameter of less than 200 microns, including 200 to 0.5 microns. In certain exemplary embodiments, the glass fibers included in the engineered wood products according to the general inventive concepts have an average diameter of 3 microns to 60 microns. In certain exemplary embodiments, the glass fibers included in the engineered wood products have an average diameter of 3 microns to 55 microns. In certain exemplary embodiments, the glass fibers included in the engineered wood products have an average diameter of 3 microns to 50 microns. In certain exemplary embodiments, the glass fibers included in the engineered wood products have an average diameter of 3 microns to 45 microns. In certain exemplary embodiments, the glass fibers included in the engineered wood products have an average diameter of 3 microns to 40 microns. In certain exemplary embodiments, the glass fibers included in the engineered wood products have an average diameter of 3 microns to 35 microns. In certain exemplary embodiments, the glass fibers included in the engineered wood products have an average diameter of 3 microns to 30 microns. In certain exemplary embodiments, the glass fibers have an average diameter of 4 microns to 25 microns. In certain exemplary embodiments, the glass fibers included in the engineered wood products have an average diameter of 5 microns to 20 microns. In certain exemplary embodiments, the glass fibers included in the engineered wood products have an average diameter of 6 microns to 20 microns. In certain exemplary embodiments, the glass fibers included in the engineered wood products have an average diameter of 7 microns to 10 microns.

In certain exemplary embodiments, the glass fibers included in the engineered wood products according to the general inventive concepts have an average diameter of 3 microns to 35 microns. In certain exemplary embodiments, the glass fibers included in the engineered wood products have an average diameter of 3 microns to 25 microns. In certain exemplary embodiments, the glass fibers included in the engineered wood products have an average diameter of 3 microns to 20 microns. In certain exemplary embodiments, the glass fibers included in the engineered wood products have an average diameter of 3 microns to 15 microns. In certain exemplary embodiments, the glass fibers included in the engineered wood products have an average diameter of 3 microns to 10 microns. In certain exemplary embodiments, the glass fibers included in the engineered wood products have an average diameter of 3 microns to 10 microns.

In certain exemplary embodiments, the glass fibers included in the engineered wood products according to the general inventive concepts have an average length greater than 2 microns. In certain exemplary embodiments, the glass fibers included in the engineered wood products have an average length of 2 microns to 25 millimeters. In certain exemplary embodiments, the glass fibers included in the engineered wood products have an average length of 5 microns to 30 millimeters. In certain exemplary embodiments, the glass fibers included in the engineered wood products have an average length of 10 microns to 25 millimeters. In certain exemplary embodiments, the glass fibers included in the engineered wood products have an average length of 20 microns to 25 millimeters. In certain exemplary embodiments, the glass fibers included in the engineered wood products have an average length of 20 microns to 20 millimeters. In certain exemplary embodiments, the glass fibers included in the engineered wood products have an average length of 20 microns to 15 millimeters. In certain exemplary embodiments, the glass fibers included in the engineered wood products have an average length of 20 microns to 10 millimeters. In certain exemplary embodiments, the glass fibers included in the engineered wood products have an average length of 25 microns to 25 millimeters. In certain exemplary embodiments, the glass fibers included in the engineered wood products have an average length of 30 microns to 25 millimeters. In certain exemplary embodiments, the glass fibers included in the engineered wood products have an average length of 35 microns to 25 millimeters. In certain exemplary embodiments, the glass fibers included in the engineered wood products have an average length of 40 microns to 25 millimeters. In certain exemplary embodiments, the glass fibers included in the engineered wood products have an average length of 45 microns to 25 millimeters. In certain exemplary embodiments, the glass fibers included in the engineered wood products have an average length of 50 microns to 25 millimeters. In certain exemplary embodiments, the glass fibers included in the engineered wood products have an average length of 100 microns to 25 millimeters. In certain exemplary embodiments, the glass fibers included in the engineered wood products have an average length of 200 microns to 25 millimeters. In certain exemplary embodiments, the glass fibers included in the engineered wood products have an average length of 300 microns to 25 millimeters. In certain exemplary embodiments, the glass fibers included in the engineered wood products have an average length of 400 microns to 25 millimeters. In certain exemplary embodiments, the glass fibers included in the engineered wood products have an average length of 500 microns to 25 millimeters.

In certain exemplary embodiments, the glass fibers included in the engineered wood products have an average length of 2 microns to 25 millimeters. In certain exemplary embodiments, the glass fibers included in the engineered wood products have an average length of 2 microns to 20 millimeters. In certain exemplary embodiments, the glass fibers included in the engineered wood products have an average length of 2 microns to 15 millimeters. In certain exemplary embodiments, the glass fibers included in the engineered wood products have an average length of 2 microns to 10 millimeters. In certain exemplary embodiments, the glass fibers included in the engineered wood products have an average length of 2 microns to 5 millimeters. In certain exemplary embodiments, the glass fibers included in the engineered wood products have an average length of 2 microns to 4 millimeters. In certain exemplary embodiments, the glass fibers included in the engineered wood products have an average length of 2 microns to 3 millimeters. In certain exemplary embodiments, the glass fibers included in the engineered wood products have an average length of 2 microns to 2 millimeters. In certain exemplary embodiments, the glass fibers included in the engineered wood products have an average length of 2 microns to 1 millimeter.

Typically, the amount of glass fiber in the engineered wood product is less than the amount of wood fibers in the engineered wood product. The term “fibrous material” as used herein refers to the combined amount of wood fiber and glass fiber. The term wood fiber will be understood by those of ordinary skill in the art to refer to wood materials that are smaller than wood chips or shavings and more closely resemble sawdust, though, for the purposes of the general inventive concepts, wood fibers may be defibrated wood-sourced materials and need not be as fine as sawdust.

In certain exemplary embodiments, the amount of glass fiber in the engineered wood product is less than 50% by weight of the fibrous material in the engineered wood product, including 1% to 50%. In certain exemplary embodiments, the amount of glass fiber in the engineered wood product is 2% to 50% by weight of the fibrous material. In certain exemplary embodiments, the amount of glass fiber in the engineered wood product is 3% to 50% by weight of the fibrous material. In certain exemplary embodiments, the amount of glass fiber in the engineered wood product is 4% to 50% by weight of the fibrous material. In certain exemplary embodiments, the amount of glass fiber in the engineered wood product is 5% to 50% by weight of the fibrous material. In certain exemplary embodiments, the amount of glass fiber in the engineered wood product is 10% to 50% by weight of the fibrous material. In certain exemplary embodiments, the amount of glass fiber in the engineered wood product is 15% to 50% by weight of the fibrous material. In certain exemplary embodiments, the amount of glass fiber in the engineered wood product is 20% to 50% by weight of the fibrous material. In certain exemplary embodiments, the amount of glass fiber in the engineered wood product is 25% to 50% by weight of the fibrous material. In certain exemplary embodiments, the amount of glass fiber in the engineered wood product is 30% to 50% by weight of the fibrous material. In certain exemplary embodiments, the amount of glass fiber in the engineered wood product is 35% to 50% by weight of the fibrous material. In certain exemplary embodiments, the amount of glass fiber in the engineered wood product is 40% to 50% by weight of the fibrous material. In certain exemplary embodiments, the amount of glass fiber in the engineered wood product is 40% to 55% by weight of the fibrous material.

In certain exemplary embodiments, the amount of glass fiber in the engineered wood product is 1% to 50% by weight of the fibrous material. In certain exemplary embodiments, the amount of glass fiber in the engineered wood product is 2% to 45% by weight of the fibrous material. In certain exemplary embodiments, the amount of glass fiber in the engineered wood product is 2% to 40% by weight of the fibrous material. In certain exemplary embodiments, the amount of glass fiber in the engineered wood product is 2% to 35% by weight of the fibrous material. In certain exemplary embodiments, the amount of glass fiber in the engineered wood product is 2% to 30% by weight of the fibrous material. In certain exemplary embodiments, the amount of glass fiber in the engineered wood product is 2% to 25% by weight of the fibrous material. In certain exemplary embodiments, the amount of glass fiber in the engineered wood product is 2% to 20% by weight of the fibrous material. In certain exemplary embodiments, the amount of glass fiber in the engineered wood product is 2% to 15% by weight of the fibrous material. In certain exemplary embodiments, the amount of glass fiber in the engineered wood product is 2% to 10% by weight of the fibrous material.

In certain exemplary embodiments, the amount of glass fiber in the engineered wood product is greater than 4%, including 4% to 50% by weight of the fibrous material. In certain exemplary embodiments, the amount of glass fiber in the engineered wood product is 4% to 45% by weight of the fibrous material. In certain exemplary embodiments, the amount of glass fiber in the engineered wood product is 4% to 40% by weight of the fibrous material. In certain exemplary embodiments, the amount of glass fiber in the engineered wood product is 4% to 35% by weight of the fibrous material. In certain exemplary embodiments, the amount of glass fiber in the engineered wood product is 4% to 30% by weight of the fibrous material. In certain exemplary embodiments, the amount of glass fiber in the engineered wood product is 4% to 25% by weight of the fibrous material. In certain exemplary embodiments, the amount of glass fiber in the engineered wood product is 4% to 20% by weight of the fibrous material. In certain exemplary embodiments, the amount of glass fiber in the engineered wood product is 4% to 15% by weight of the fibrous material.

Another way to characterize the fibrous material in an engineered wood product is by the (weight) ratio of wood fibers to glass fibers. In certain exemplary embodiments, glass fibers and wood fibers are present in the engineered wood product in a ratio of 1:20 to 1:1 by weight of the fibers in the engineered wood product. In certain exemplary embodiments, glass fibers and wood fibers are present in the engineered wood product in a ratio of 1:15 to 1:1. In certain exemplary embodiments, glass fibers and wood fibers are present in the engineered wood product in a ratio of 1:10 to 1:1. In certain exemplary embodiments, glass fibers and wood fibers are present in the engineered wood product in a ratio of 1:5 to 1:1. In certain exemplary embodiments, glass fibers and wood fibers are present in the engineered wood product in a ratio of 1:4 to 1:1. In certain exemplary embodiments, glass fibers and wood fibers are present in the engineered wood product in a ratio of about 2:3.

Method of Use

In another aspect, a method of producing an engineered wood product is provided. The method of making the engineered wood products according to the general inventive concepts can be integrated with the manufacturing process of a conventional engineered wood product. The method generally involves mixing wood fibers and glass fibers to form a fibrous material mixture and adding a resinous binder to the fibrous material mixture and allowing the resin to cure. In other embodiments, the resinous binder may be added to the glass fibers and combining the glass with wood fibers, mixing the wood-resin-glass mixture and allowing the resin to cure. In certain exemplary embodiments, the mixture is heated to cure the binder, including heating under pressure to a temperature of above 400° F. In certain exemplary embodiments, the resinous binder is an MDI resin, including pMDI. In certain exemplary embodiments, the resinous binder is a formaldehyde based resin, including urea formaldehyde (UF). In certain exemplary embodiments, glass fiber is included in an amount of 1% to 60%, including 4% to 50% by weight of the fibrous material. In certain exemplary embodiments, the method further comprises heating the glass-resin-wood mixture. In certain exemplary embodiments, heating the glass-resin-wood mixture also includes pressing the mixture to form an engineered wood product. In certain embodiments, resin may be added in one or more portions with mixing of the fibers. In certain exemplary embodiments, the wood fibers and glass fibers are mixed by mechanical means, in certain exemplary embodiments, the glass fibers and wood fibers are mixed by mechanical means in combination with directed or pressurized air to improve mixing.

The general inventive concepts provide an effective processing method for bundled or entangled fiberglass that ensures quality fiberboard products (based on both aesthetic and performance properties); the examples show that turbulence (e.g., air flow) is a key in effectively mixing (processed) fiberglass with wood fiber. Moreover, the engineered wood products according to the general inventive concepts demonstrate: improved moisture resistance for specific loading percentages of fiberglass, without adding wax or any other additives; improved acoustic damping for specific loading percentages of fiberglass; improved fire resistance for specific loading percentages of fiberglass, without adding any additional/specific chemicals (e.g., flame retardants to improve flame resistance); maintaining mechanical properties such as internal bonding, flexural strength, and face screw pull with substantial fiberglass loading; pMDI provides beneficial results in comparison to UF in a variety of benchmarks; there is less spring back of the fiberboard product by replacing a portion of compliant wood fiber with glass fiber; the boards show higher surface roughness in engineered wood boards that have higher ratios of fiberglass; and ultra-high density fiberboards can be easily fabricated by replacing a portion of the wood fiber with glass fibers (the density of fiberglass is at least twice the density of common wood fiber).

The following examples are provided merely for illustrative purposes, those of skill in the art will recognize many variations that are within the spirit of the invention, limited only by the scope of the claims.

Examples

Different types of fiberglass were used as the additive in the following examples. The formulation of the glass itself, fiber length and diameter, as well as the format of the samples were varied. Performance of the engineered wood boards that are produced indicate that shredding is an important processing step only for bundled glass and/or entangled glass to ensure a good mix with wood fiber and uniformity in the final product. FIG. 1 shows the results of shredding exemplary fibers (shown with unshredded glass fiber rovings). Shredding the composite glass appears to be an important step for improving the mixing with wood fiber. The shredded fibers may then be screened based on the size of the screen mesh that is placed at the end of the process, which limits the passage of fiber to less than a certain length. However, in certain embodiments, shredding might not be necessary if the starting condition of the glass is neither bundled nor entangled.

Example 1: A series of engineered wood product boards were made using 40% glass and 56% wood and 4% binder (pMDI), according to the following procedure: 1—Glass fiber is added to the wood fiber, and mixed in a blender with enough turbulence to mix and distribute the fibers. 2—Resin is sprayed onto the mixture and the final mixture is further blended for better uniformity. 3—The mixture is cold pressed (see FIG. 2) using a plunger and a box, transferred to a daylight press, and finally pressed under heat (approx. 445° F.) to cure the mixture to a cohesive board.

Physical observations (appearance, surface roughness, spring back, and cleanness of the trimmed edges), density of the final piece, internal bonding strength (ASTM D1037), flexural strength (ASTM D790), 24-hour water absorption test (ASTM D570) were used as key tools to compare the impact of different parameters and quality of the finished products. Other tests were also performed on some set points to gain understanding of some other aspects of the engineered wood boards: e.g., face screw withdrawal (ASTM D1037), laboratory acoustic testing (modal damping), and laboratory scale fire test (simple flame test as well as small scale tunnel). Optical microscopy and scanning electron microscopy were used to measure distributions of fiber length and diameter (FIGS. 9-12). Scanning electron microscopy was also used as a tool to investigate the uniformity of the engineered wood boards by imaging the cross section of the final products. Method MAL 1.1 was used to measure the optical length distributions. Four hundred fibers were measured for each. Milled insulation waste was too short for optical lengths and 5- and 11-micron insulation glass, as well as the bonded mineral wool were too curled to measure lengths.

Commercial MDF/HDF samples were purchased from a local store (exact formulation is not known) for use as a control board.

Example 2: A series of engineered wood boards were produced using 4% by weight resin (pMDI), 10-60% by weight shredded glass, with the remainder being wood fiber. Control boards (comprising only wood fiber and resin) were also produced.

Example 3: A series of engineered wood boards were produced using 10% by weight resin (UF), 10-60% by weight shredded glass, with the remainder being wood fiber. Control boards (comprising only wood fiber and resin) were also produced.

In case of pMDI boards, wood fiber is conditioned to about 15-25% moisture level prior to mixing (simply by spraying water on layers of wood fiber, and storing it in capped buckets). Isocyanate (NCO) groups of pMDI produce amine upon reaction with water, which then reacts with another NCO group, allowing the resin to cure. UF resin naturally contains water and therefore the natural moisture of wood fiber is sufficient (5-15%) to induce curing.

Figure 2:
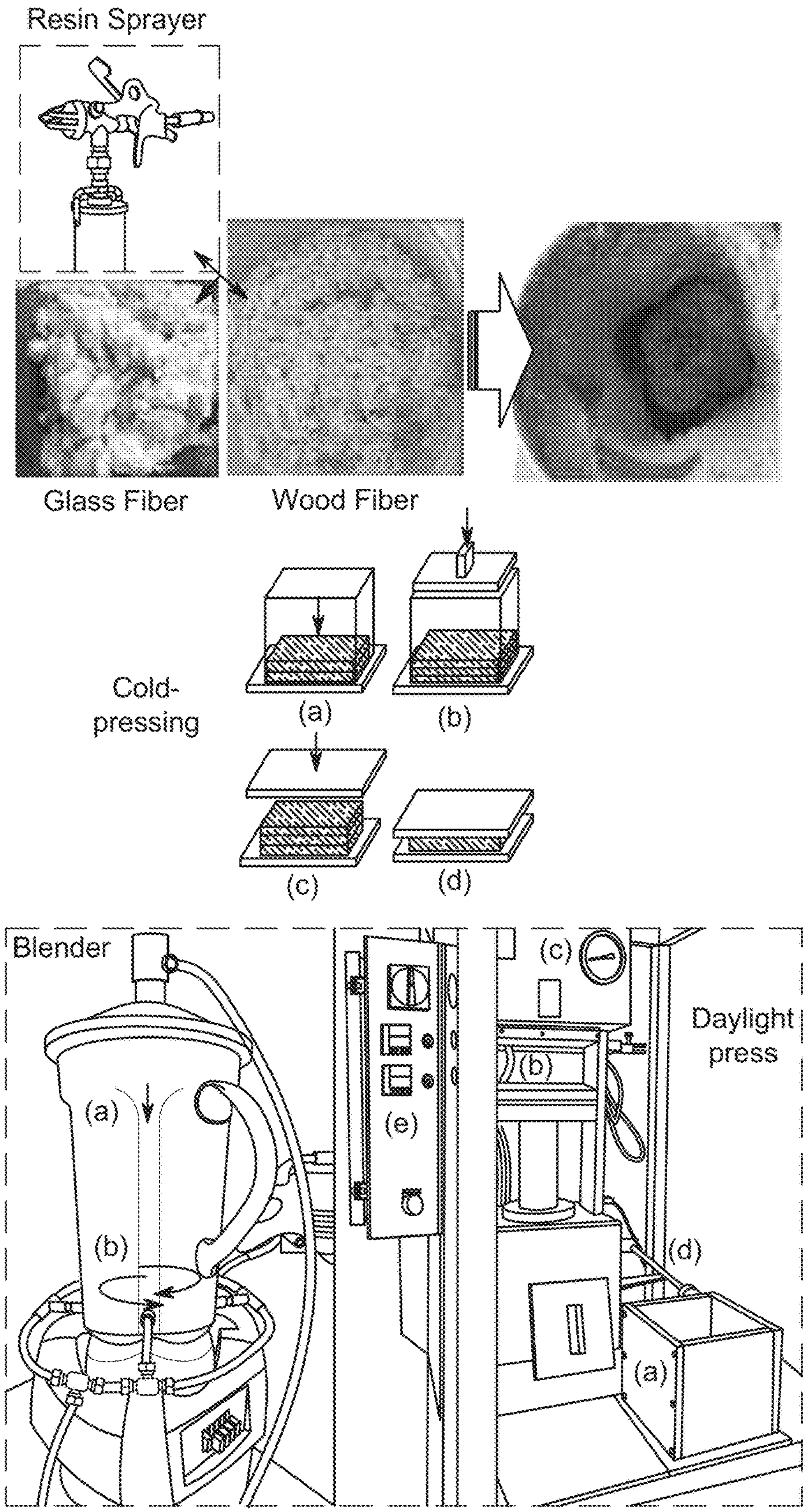
FIG. 2 shows images of an exemplary system for formulating the wood-glass-resin mixture and pressing engineered wood boards. One means for introducing the resin into the system is spraying the resin onto the glass-wood mixture in a blender. A blender is shown modified with air inlets to create turbulence for mechanical mixing of the fibers. A daylight press may then be used to heat and press the fibrous mixture.
Figure 3:
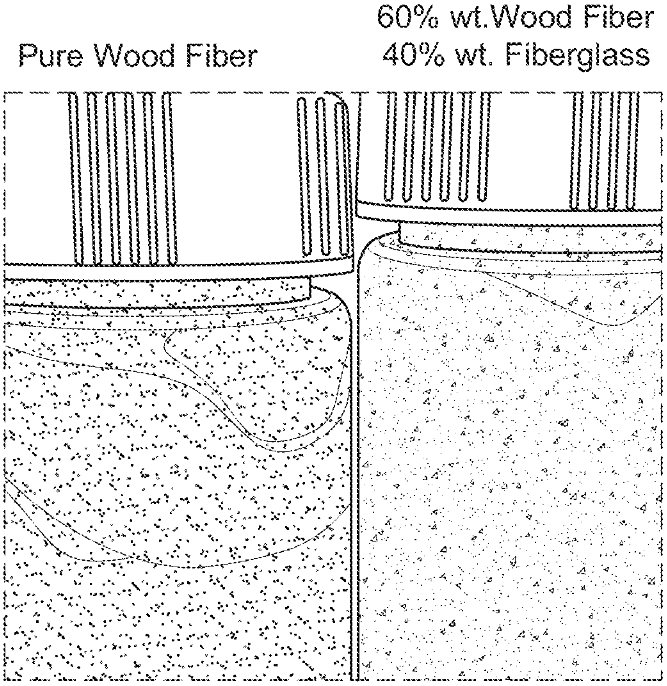
FIG. 3 shows pure wood fiber compared to a mixture of wood fiber and shredded dry composite glass at 40% wt.
Figure 4:
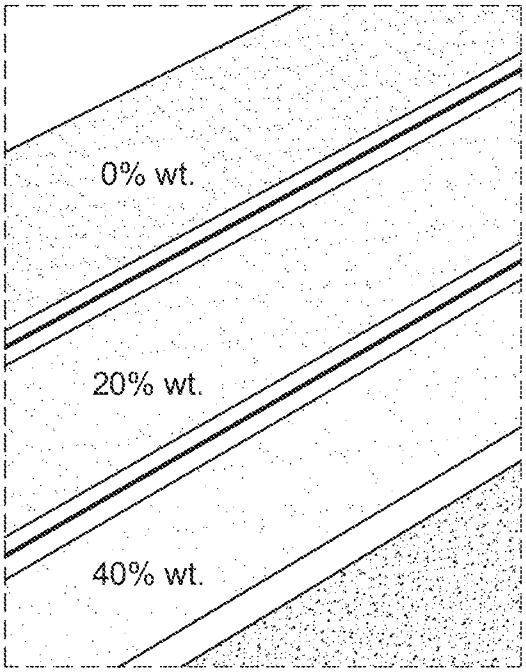
FIG. 4 shows HDF samples with different loading of shredded composite glass (0, 20, and 40% wt.).
Figure 5:
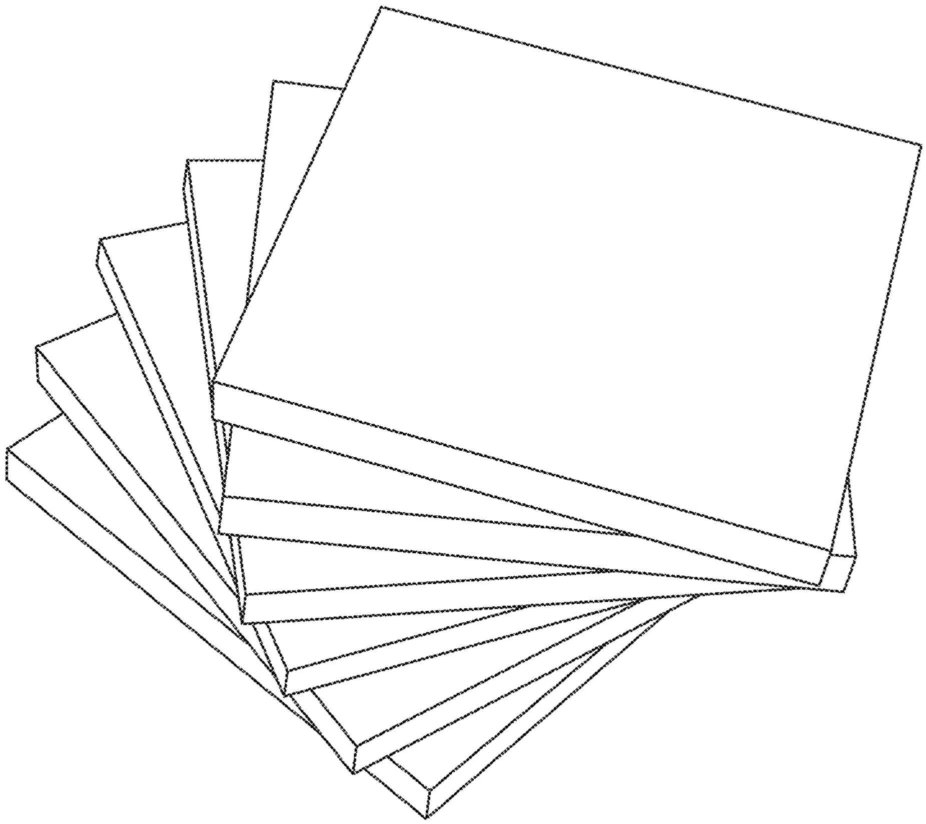
FIG. 5 shows a set of engineered wood boards, alternating 20% and 40% wt. shredded composite glass.

In laboratory scale, a modified blender was used to effectively mix fiberglass and wood fiber. This blender had added air inlets in order to create a whirlwind-like stream inside the blender, and to efficiently mix the two types of fibers. The resin would then be added via a sprayer to the mixture. Cold pressing is the step that follows, were a pack of the mixture is made manually at room temperature, and finally this pack is transferred to a daylight press to get heated and pressed under set conditions. FIG. 2 shows all these steps in detail, and each step will be elaborated further in the following sections. FIG. 3 compares pure wood fiber to a mixture of wood and glass with 40% wt. glass which looks identical to the observer. In FIGS. 4 and 5 images of some final products are presented to represent the quality of the engineered wood boards fabricated with processed glass and under our customized mixing methods. Some of our visual observations include: less spring back by replacing complaint wood fiber with fiberglass, as well as more roughness in the surface by adding and increasing fiberglass additive. As can be seen in FIG. 4, the samples appear identical at the edge of the final board. Addition of glass reduces the spring back and inconsistency in the thickness. While the boards in FIG. 5 appear substantially identical, laboratory observations determined that addition of glass increases the roughness in the surface.

In different formulations, 10-60% (by weight) replacement of wood fiber with glass fibers was targeted. To account for the compressibility of the wood, different empirical trials were run to come up with a correction factor that would allow for obtaining the right density considering the dimensions of the board (8"× 8"×0.25"). Typically, conditioned wood and glass fibers are mixed for 10 seconds, hit with one spray of resin, mixed for another 10 second before hitting the second spray of resin, and then mixed for one full minute in the blender. The mixture (30-40 grams for each portion), is then divided into two, and each half was run for another minute to ensure good uniformity.

Due to the high viscosity of pMDI and UF, a paint sprayer was used to atomize the resin and efficiently spray that onto the mixture. The sprayer was simply weighed before and after each spray, allowing for loading the resin at a certain percentage (typically 3%, 4%, or 5% by weight for pMDI, and 8%, 10%, and 12% by weight for UF). The next step was mixing the portions in a large bucket, and then pressing the mixture into a board (i.e., "cold pressing") where the mixture is sprinkled on an aluminum plate in layers, each layer is pressed with a plunger, until the whole mixture is pressed by hand into a fuzzy slab (b). Then the surrounding box is removed, and the plunger is replaced with the heavy aluminum top-plate (b and c), and finally the sandwiched slab is ready to be pressed in the hydraulic press (d) (see FIG. 2).

Those of skill in the art will recognize that a variety of engineered wood products can be made according to the general inventive concepts by varying the type and amount of glass, for example.

Figure 6:
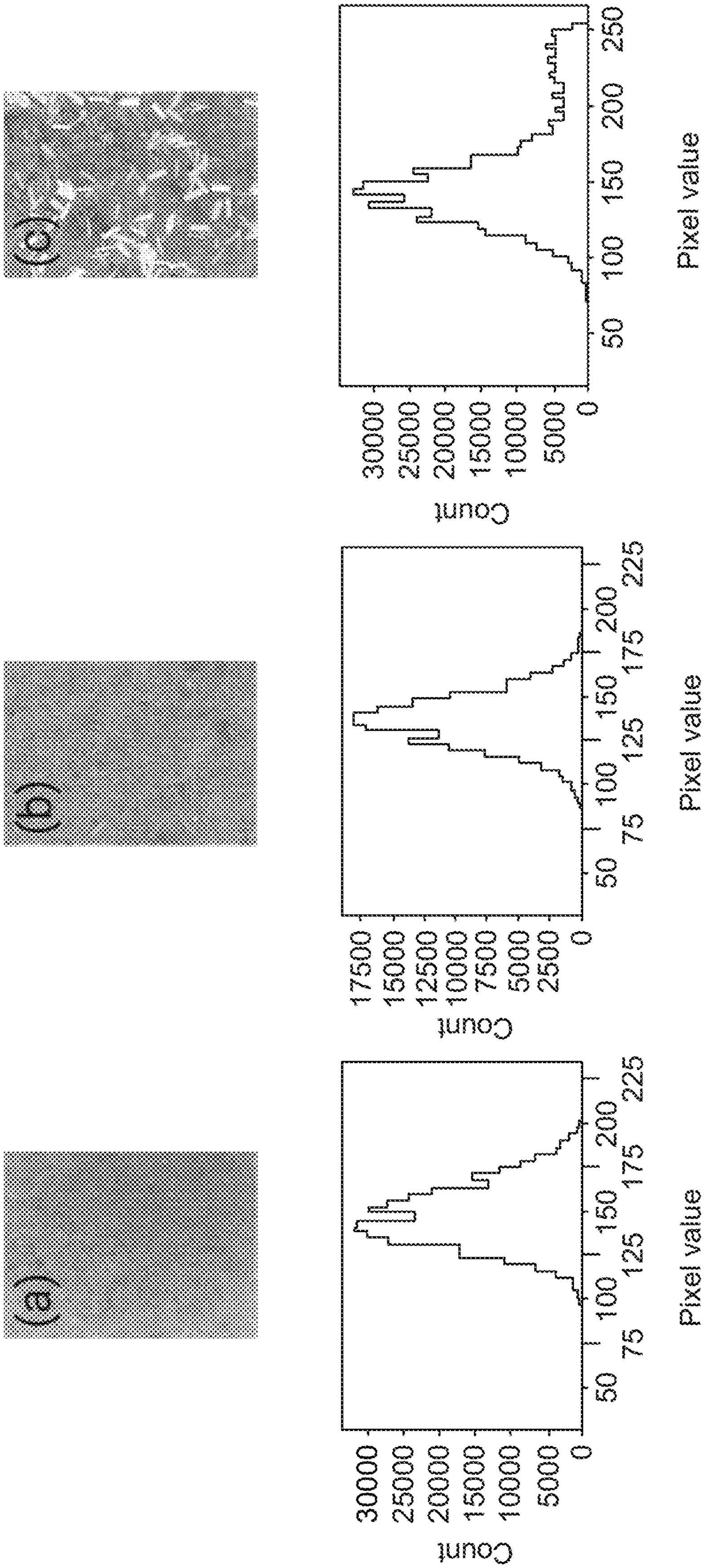
FIG. 6 shows visual analysis of unprocessed glass fibers in exemplary boards including various glass sources. The distribution of pixel intensities allows for easy recognition of unprocessed composite glass fibers via bimodal curves (c), as well as ineffective processing methods other than shredding (d).
Figure 6:
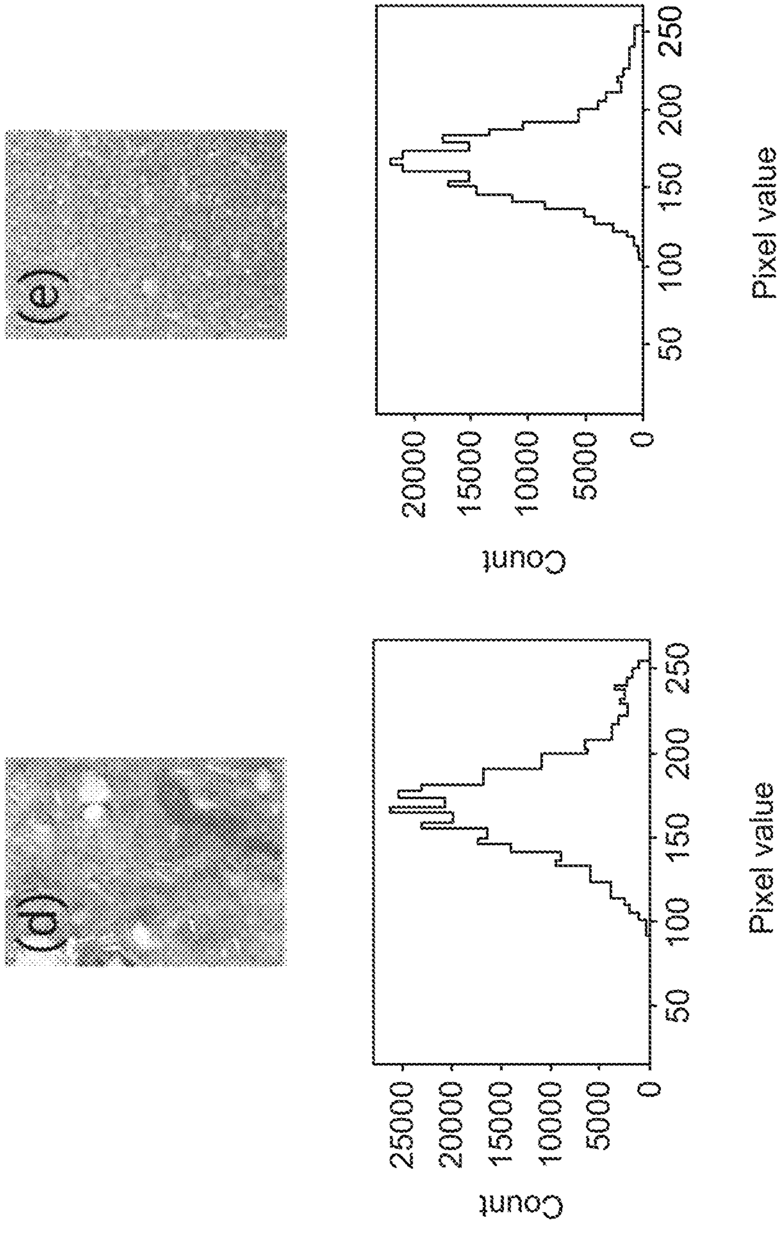
Figure 7:
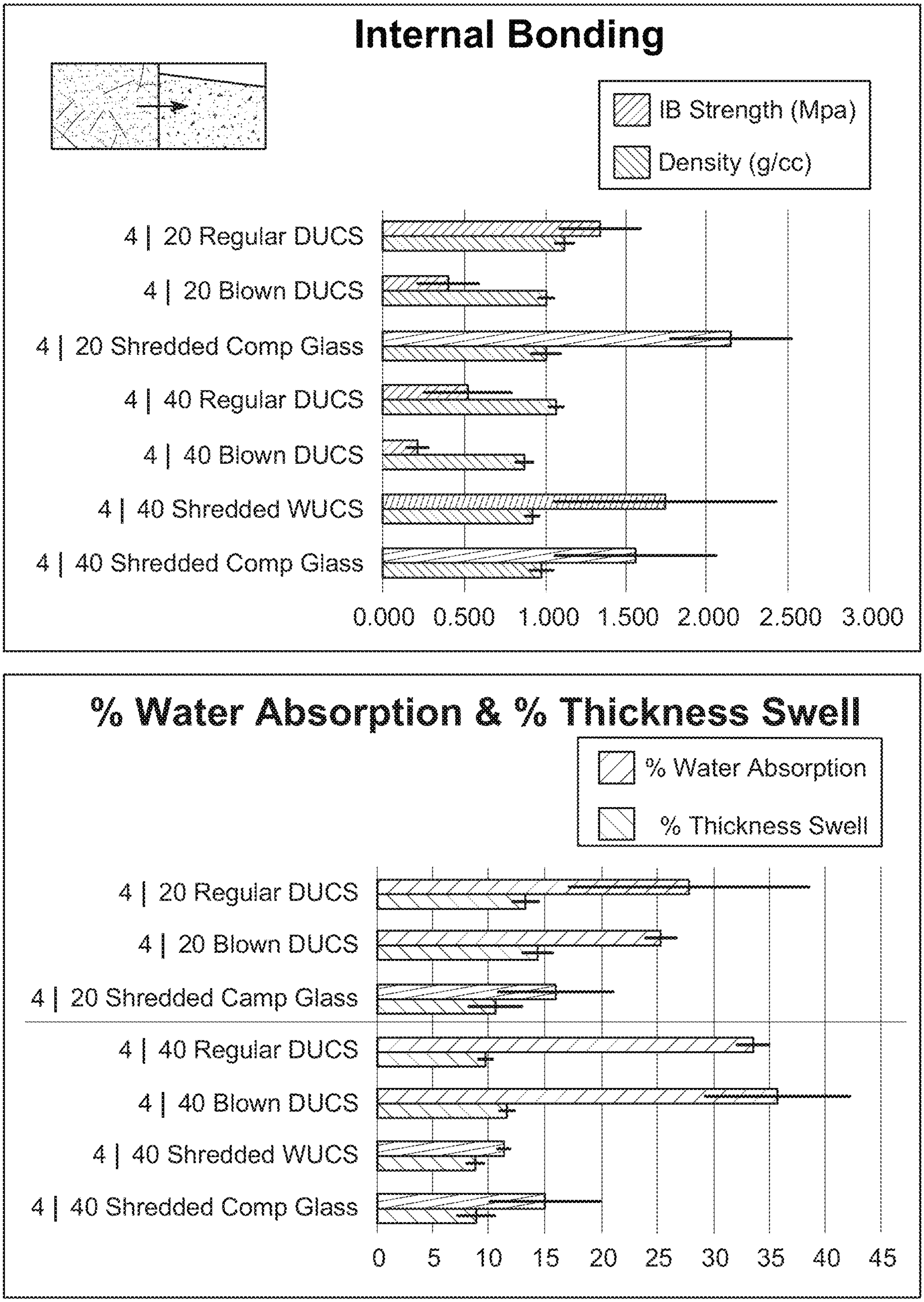
FIG. 7 shows the results of internal bonding strength and moisture resistance for engineered wood boards made with various glass sources, including shredded and non-shredded glass.

Example 4: A different method of processing the bundled composite glass was tried (blowing air under high pressures to open up bundled fiberglass), and boards according to Example 4 were compared to those of the shredded materials. According to FIGS. 6 and 7, shredding appears to be important for ideal aesthetic and performance properties in the final product. Visual metrics can easily help distinguish bundled composite glass (e.g., ineffective separation of the glass fibers form one another) and other ineffective processing methods from our proposed processed type, via comparing the distribution of pixel intensities (FIG. 6).

Figure 8:
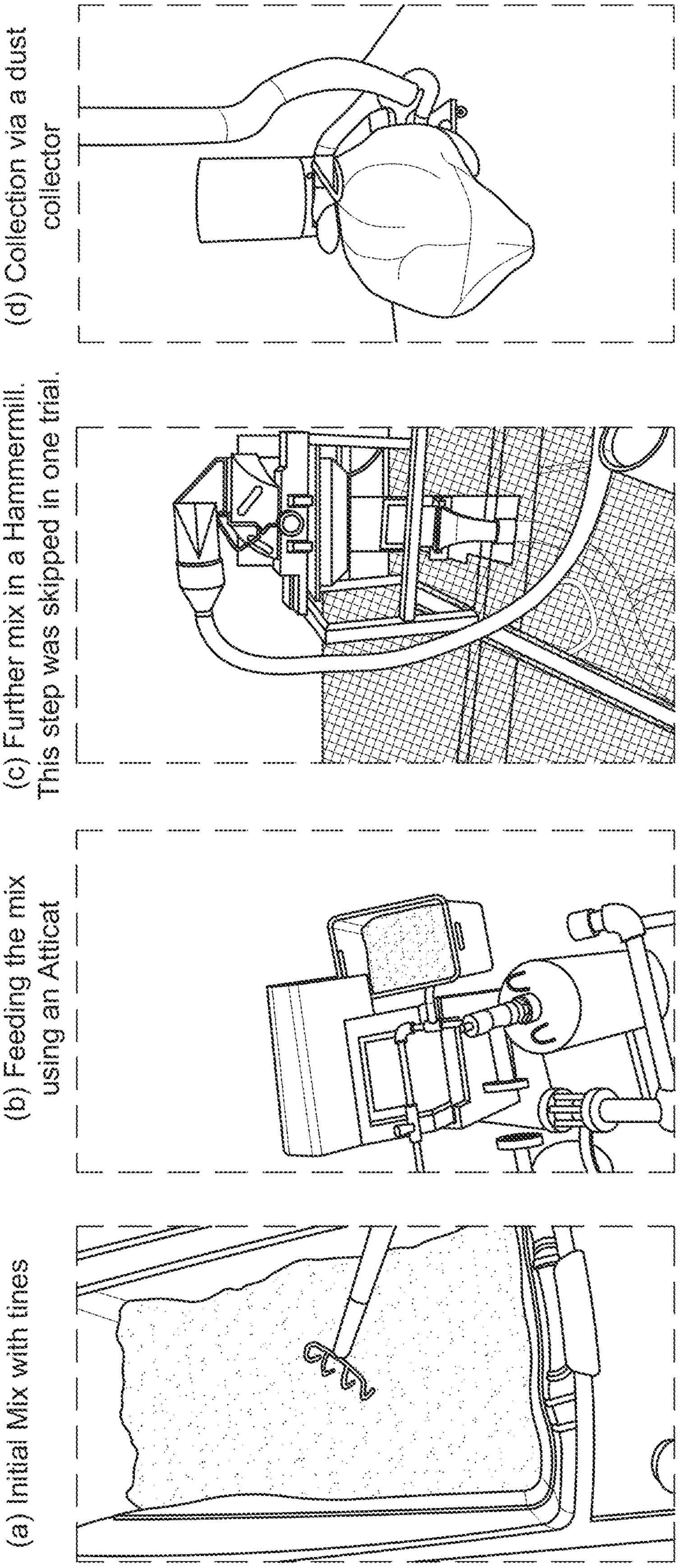
FIG. 8 shows specific means for mixing fibers for inclusion in engineered wood products. Large scale mixing of glass fibers and wood fiber. The Figure shows the importance of turbulence during the mixing process in effective mixing of the two components.

Example 5: Different approaches of mixing glass and wood fiber were tried, with turbulence component consistent among them: modified blender with air streams, A combination of Atticat and hammermill, as well as only Atticat as the mixing approach. FIG. 8 shows the larger scale mixing using Atticat, hammermill, and dust collector. All three mixing methods studied, resulted in similar performance properties (FIG. 9), confirming that the mixing method should include high turbulence as the key to an efficient mix.

Figure 9:
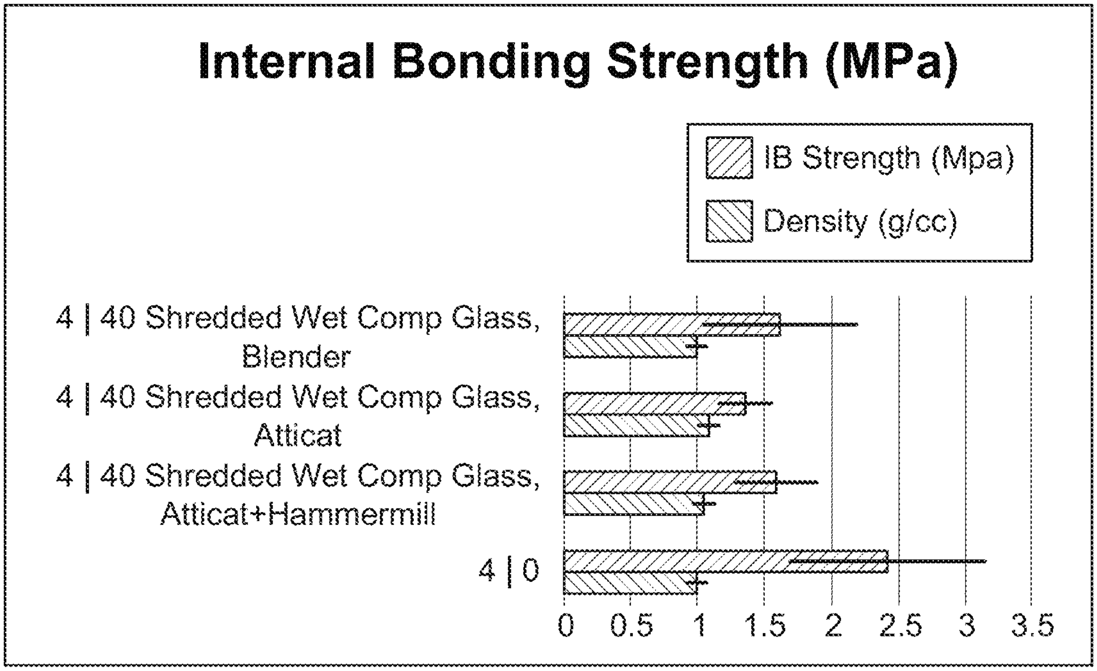
FIG. 9 shows results for internal bond strength and water absorption for engineered wood boards made using three different mixing methods.
Figure 9:
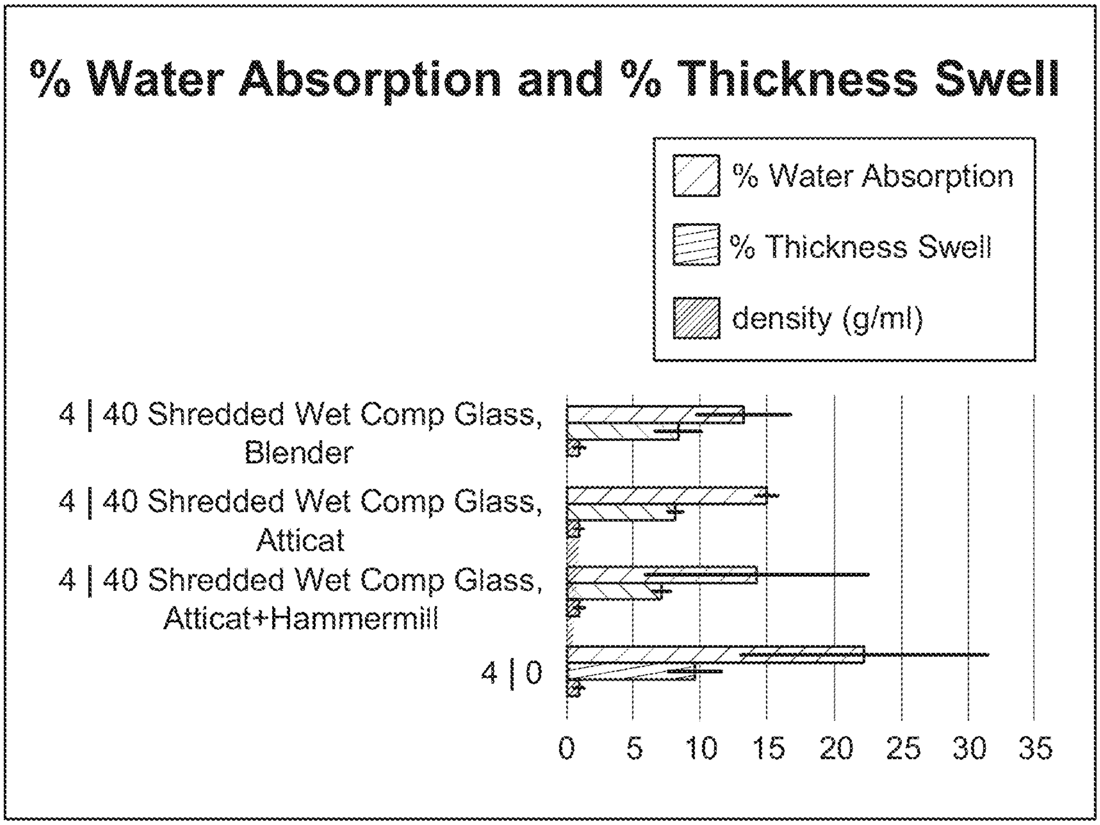

FIG. 9 compares the key properties of the engineered wood boards manufactured with these different mixes, validating the consistency among the results obtained from different routes: lab-scale blender mixing, combination of Atticat and hammermill, and using an Atticat alone. It should be noted that in order to ensure efficient mixing, the glass fibers cannot be bundled/entangled. For instance, in terms of composite glass, shredding is necessary to open up the bundles before mixing it with the wood fiber.

Additional hammermilling of the final mix appears to boost the consistency of the mix, but the necessity can depend on the type of the wood fiber and glass fibers. To elaborate on this: softer wood fiber with thicker fibers seem to yield lower quality mix only relying on our lab-scale blender, and hammermilling significantly improves the uniformity of the final product. In terms of glass fibers, measures have to be taken not to use bundled or clumped fiberglass, harming the aesthetics and/or final key properties (mechanical and moisture resistance). Though shredding is enough processing for the majority of glass types studied here, hammermilling is specifically recommended for shredded veil with chip/scrap formats.

Figure 14:
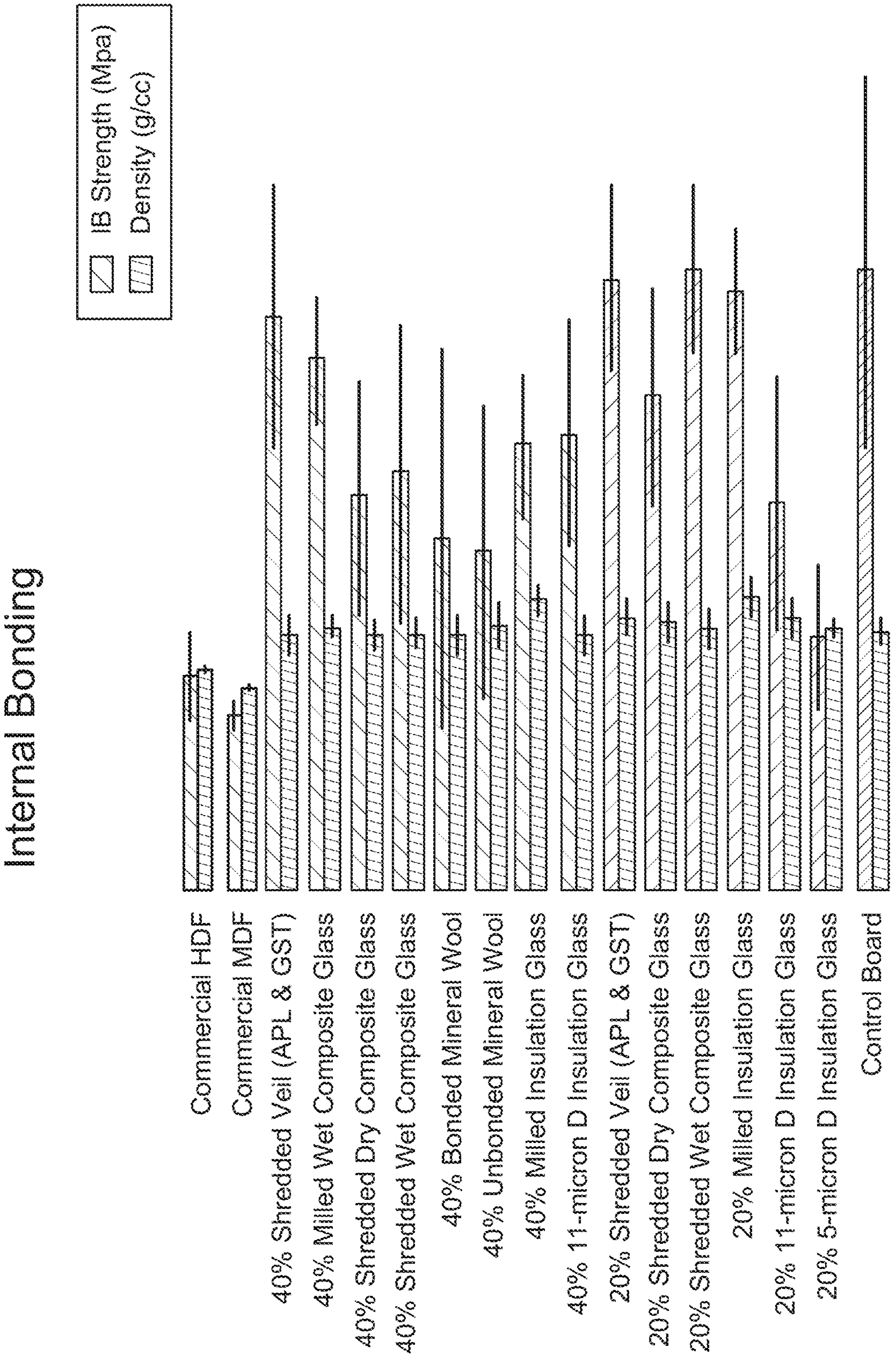
FIG. 14 shows internal bonding strength (MPa) measurements for a variety of engineered wood boards.
Figure 15:
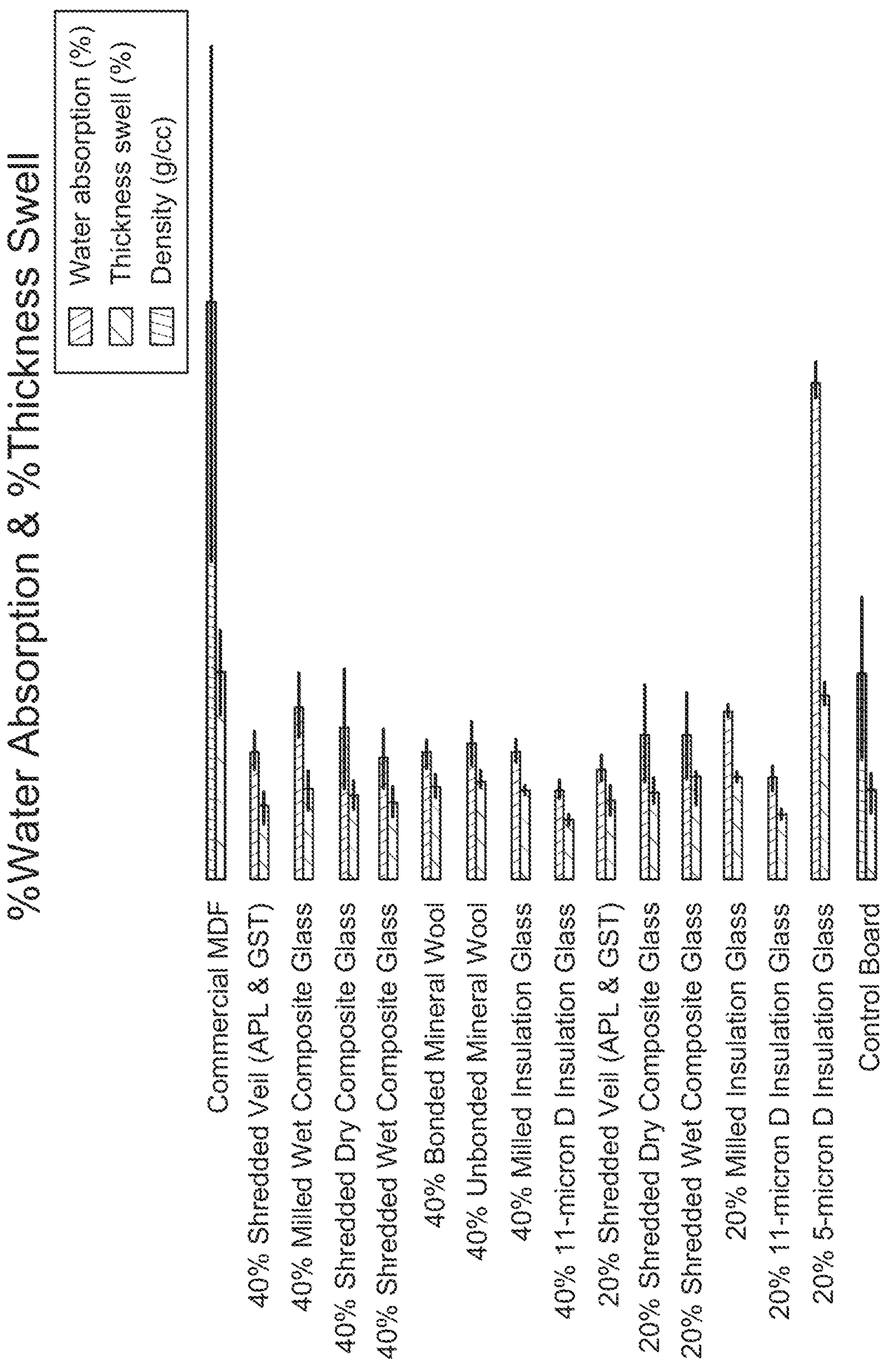
FIG. 15 shows results of water absorption test (24-hour), percentages of water absorption and thickness swell.
Figure 16:
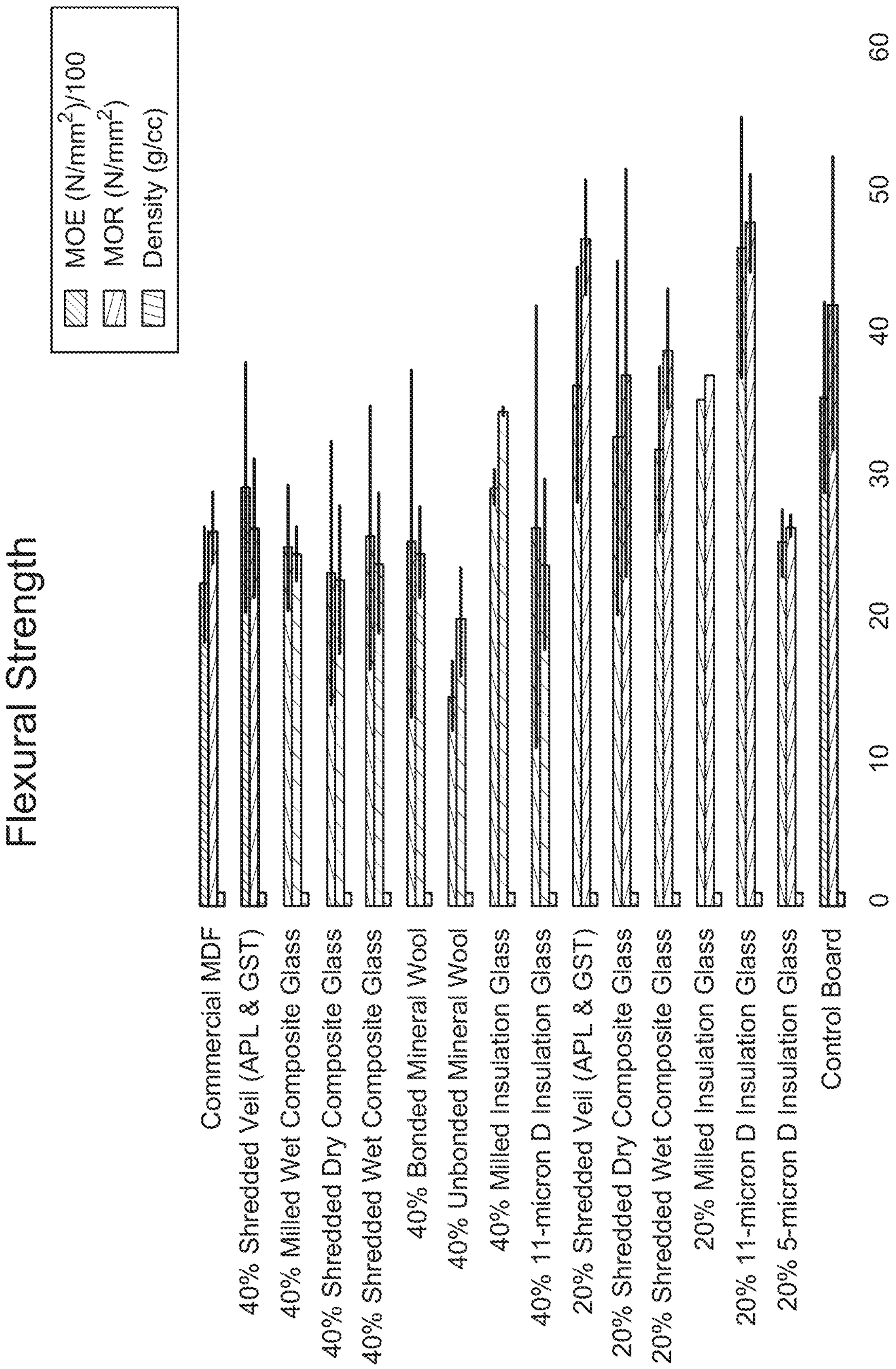
FIG. 16 shows the results of flexural strength test (modulus of elasticity and modulus of rupture).
Figure 17:
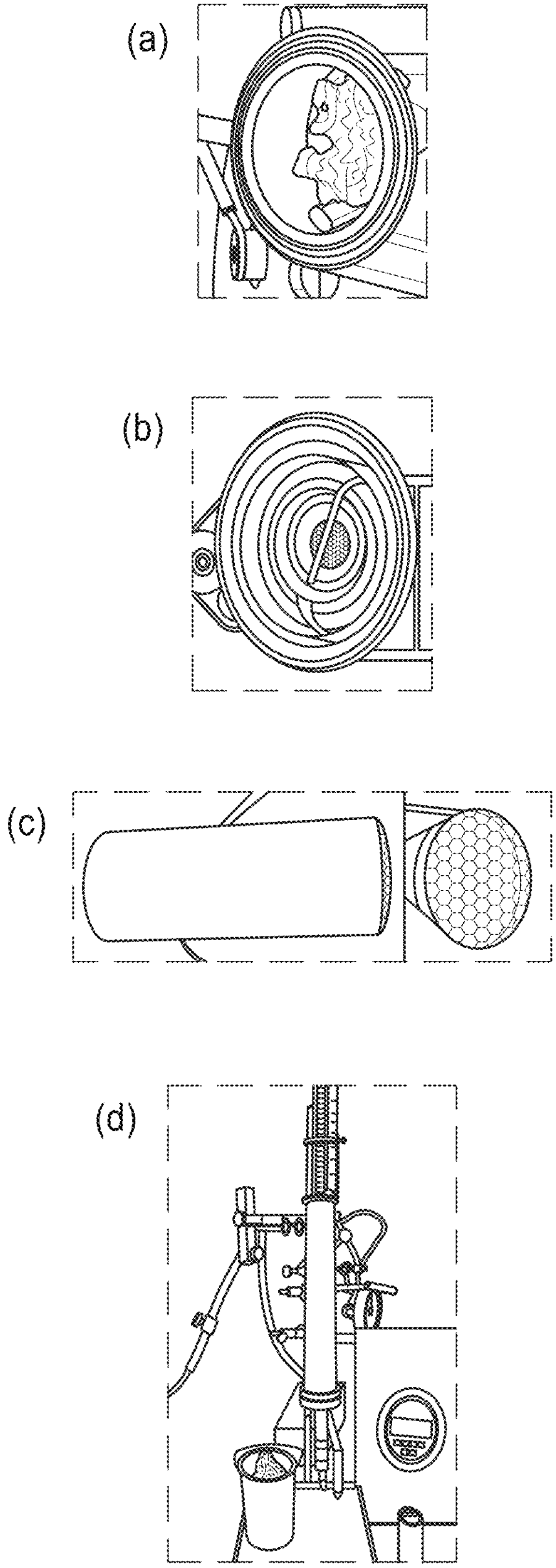
FIG. 17 is an exemplary filtration means for differentiating among different types of fiberglass with different levels of entanglement and different fiber forms. The sample is placed in the column (a), a weight of 0.5 lb that is breathable is placed on the sample to provide consistent packing (b), side and bottom view of the customized weight (c), and the overall setup where the air flow was held constant and pressure drop in the column was monitored for different samples.
Figure 18:
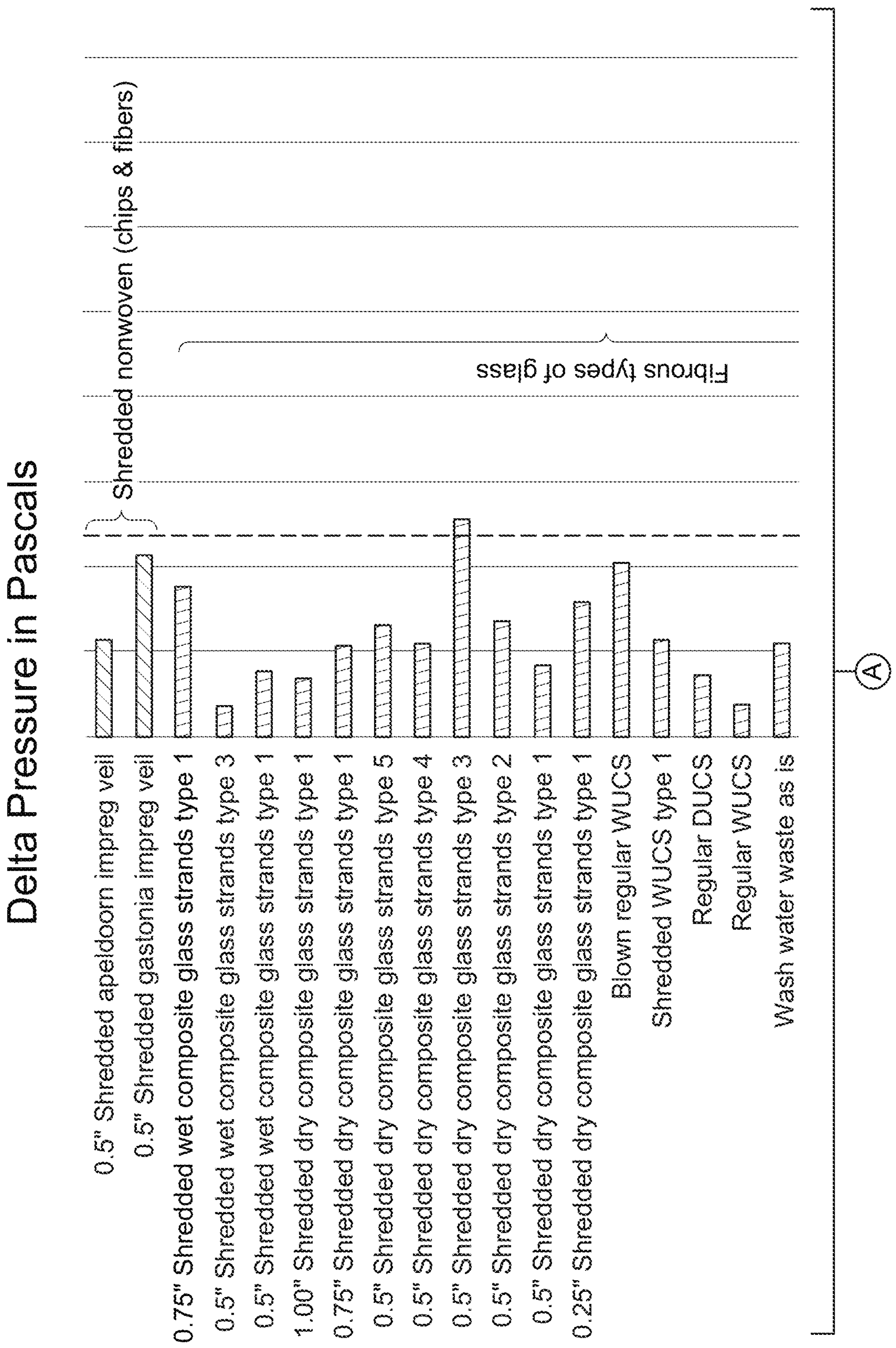
FIG. 18 shows the pressure drop compared among different types of fiberglass with different levels of entanglement and different fiber forms.
Figure 18:
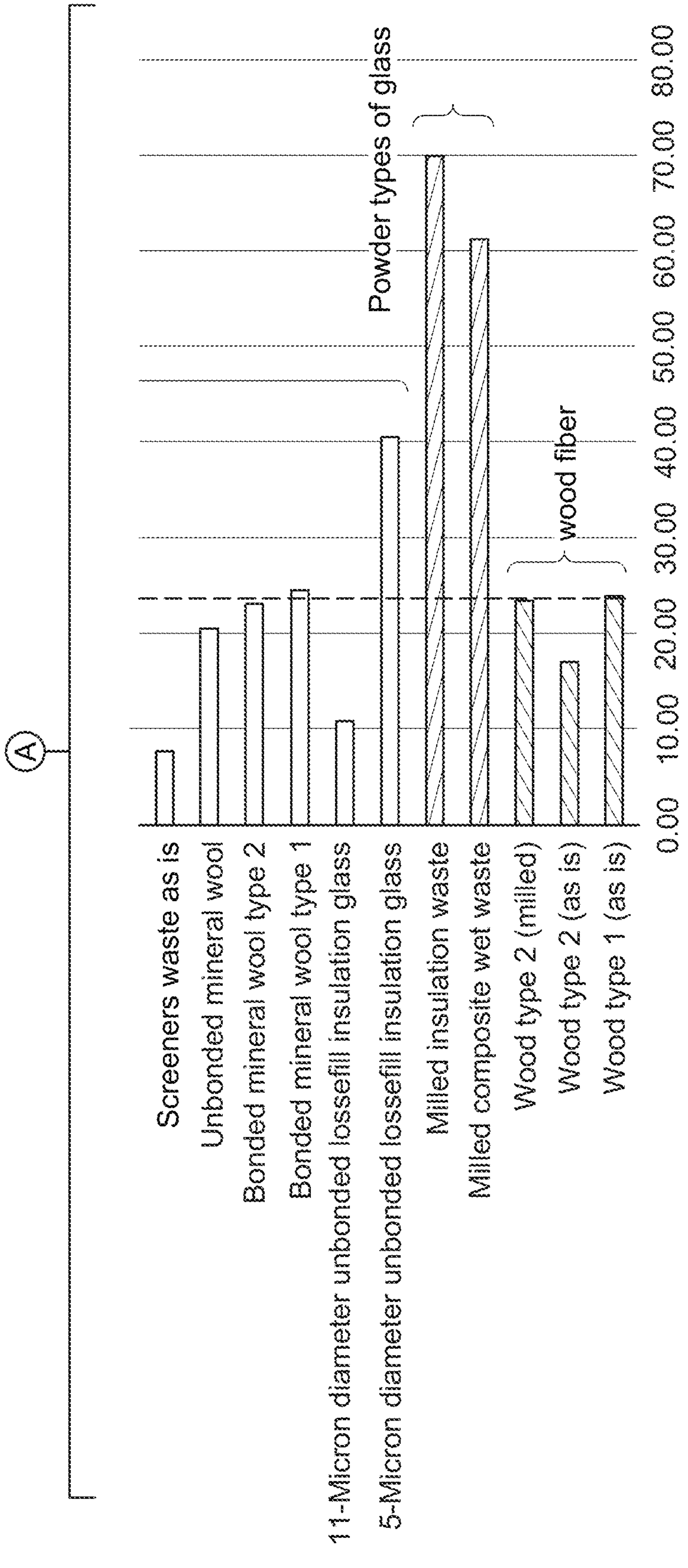
Figure 19:
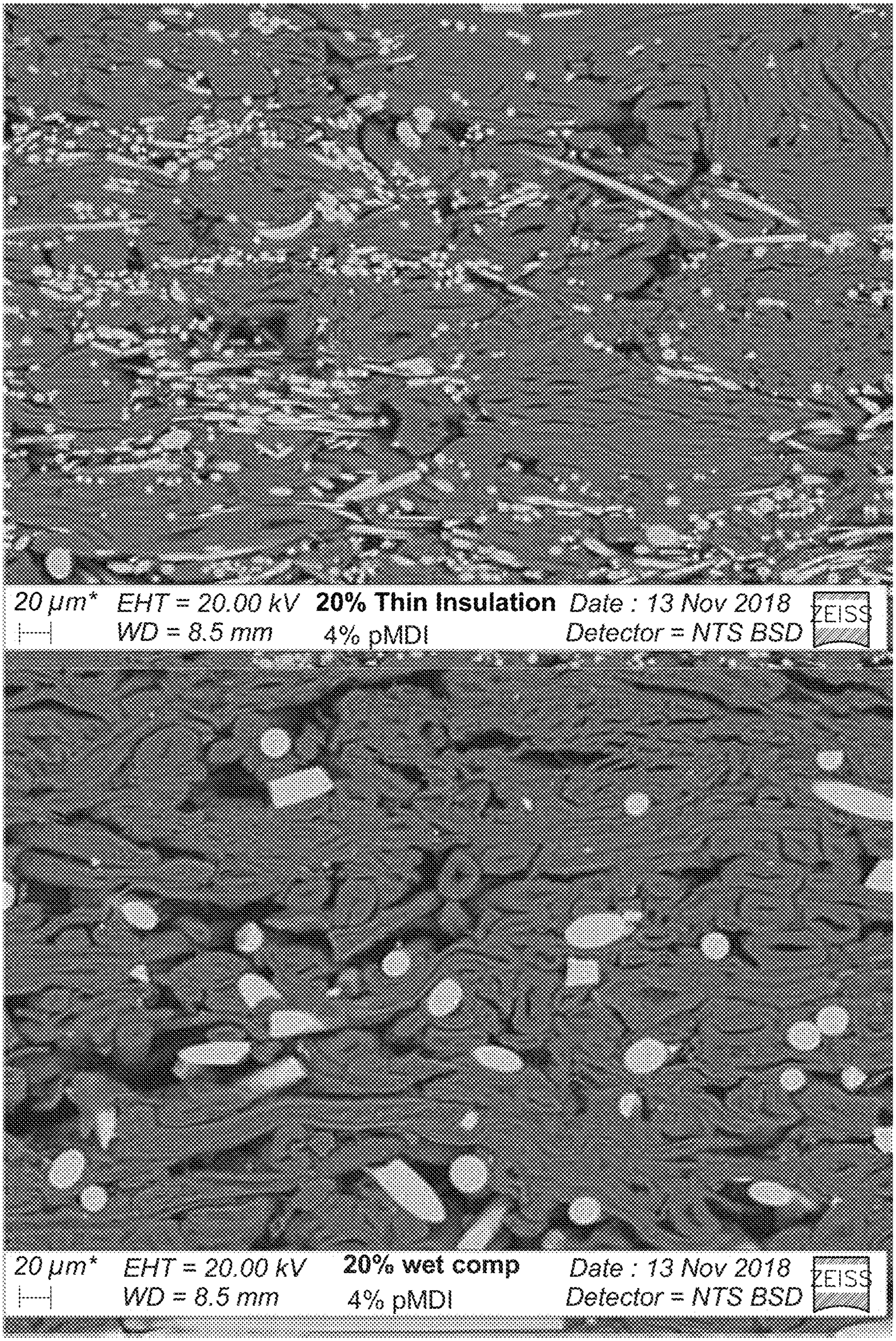
FIG. 19 shows SEM images demonstrating entanglement of various fiber mixtures. Less uniform distribution of entangled formats of fiberglass is evident even from electron microscopy images captured from the cross section of the final product (top: poor mixing using thin entangled insulation glass versus bottom: more uniform distribution of shredded wet composite glass, with the same scale bar).

Different types of fiberglass were used to make HDF boards, and key properties were compared among this wide spectrum of samples (FIGS. 14-16). As a side observation, all types of fiberglass as well as wood fiber were investigated in a pressure column, where the changes in pressure along the column was monitored versus the type of the fiber (FIG. 17). The only type that provides poor properties based on FIG. 14-16 is thin insulation glass (5 micron D, unbonded loosefill) that was highly entangled, which also creates the highest pressure drop among fibrous materials tested in our pressure column (FIG. 18). The uniformity of the distribution from this type of glass was also slightly poorer compared to composite glass (FIG. 19). This shows the dependence of the properties to the specifications of the glass incorporated in the fiberboard.

Figure 20:
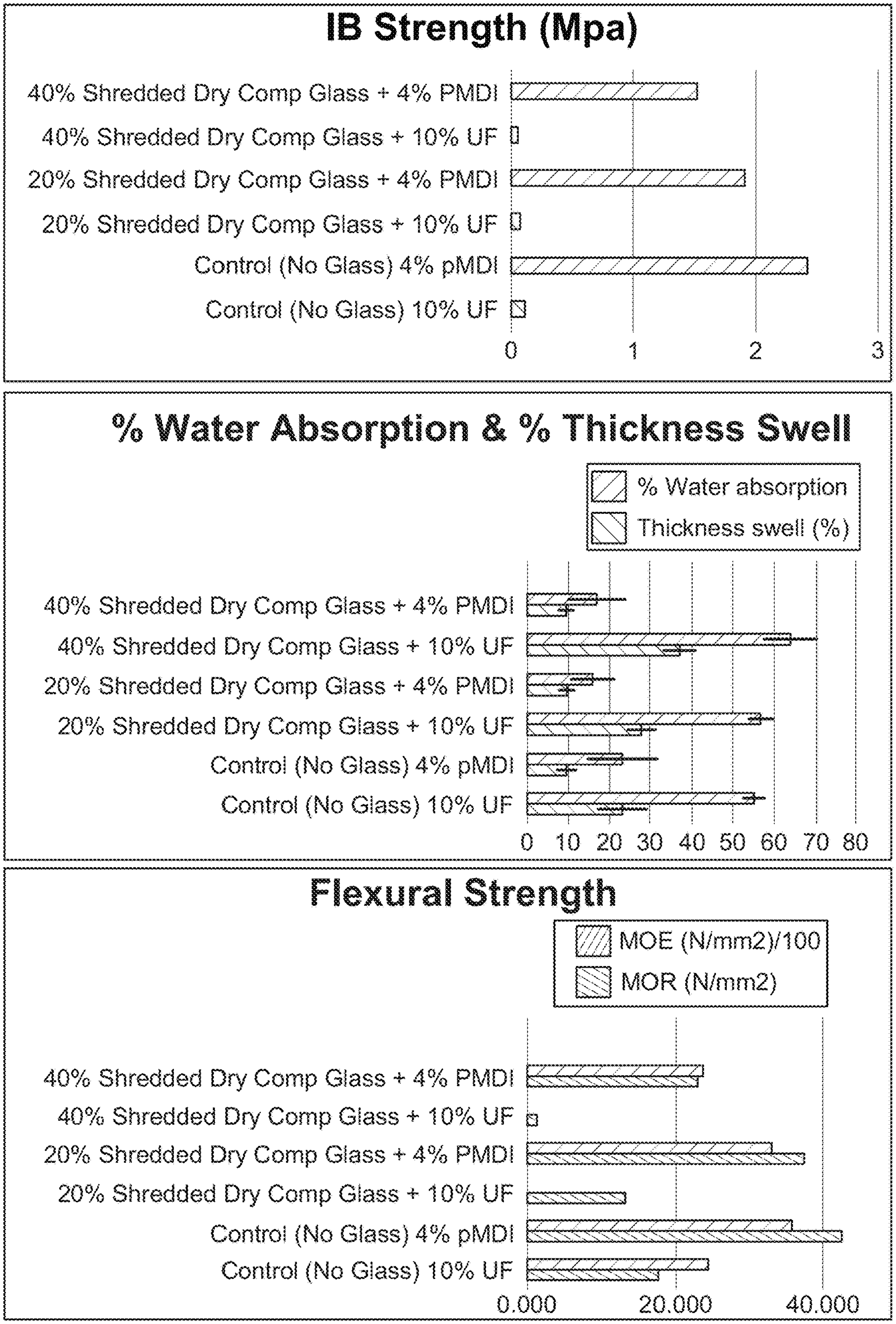
FIG. 20 shows results of tests comparing engineered wood products made with either UF resin or pMDI.

Comparing the key properties between two different resin types in FIG. 20, appears to show superior results for the properties measured. Note that the UF resin that was used in these trials is a general formulation, and not customized for wood products. Poor properties of even UF control boards (no glass added), suggests that glass is not the cause of this significant performance difference between UF and pMDI sets.

Figure 21:
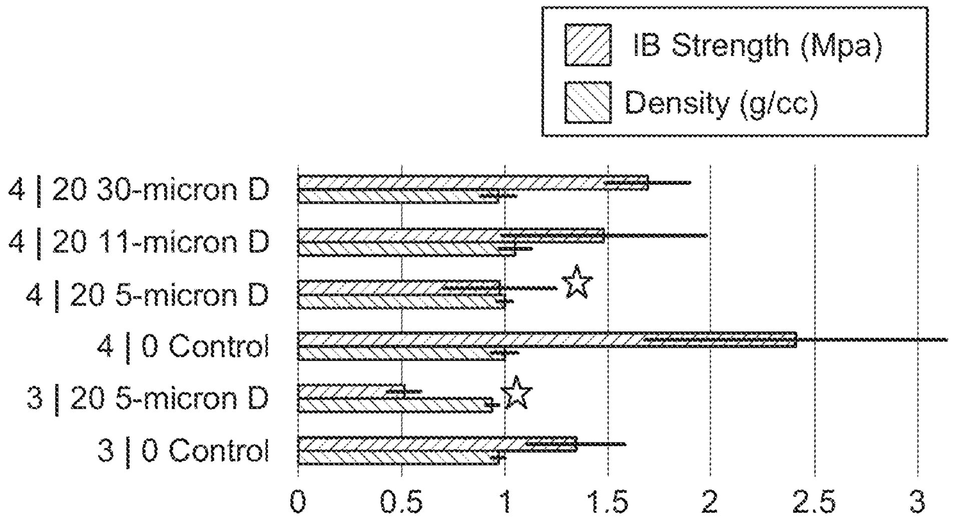
FIG. 21 shows a comparison of internal bonding for specimens with different resin loading and different micronage of fiber. Higher ratio of resin and larger fiber diameters tend to improve the effective interfacial interaction between wood and fiberglass.

FIG. 21 compares two different ratios of pMDI resin for a specific type of glass fiber, where improvements in internal bonding is evident by increasing the amount of the resin, as expected. It should also be noted that an increase in the fiber diameter for this specific glass, improves the consistency of the engineered wood board (higher internal bonding). This confirms that entangled glass fiber types mitigate the quality of the engineered wood boards, as suggested earlier.

Figure 22:
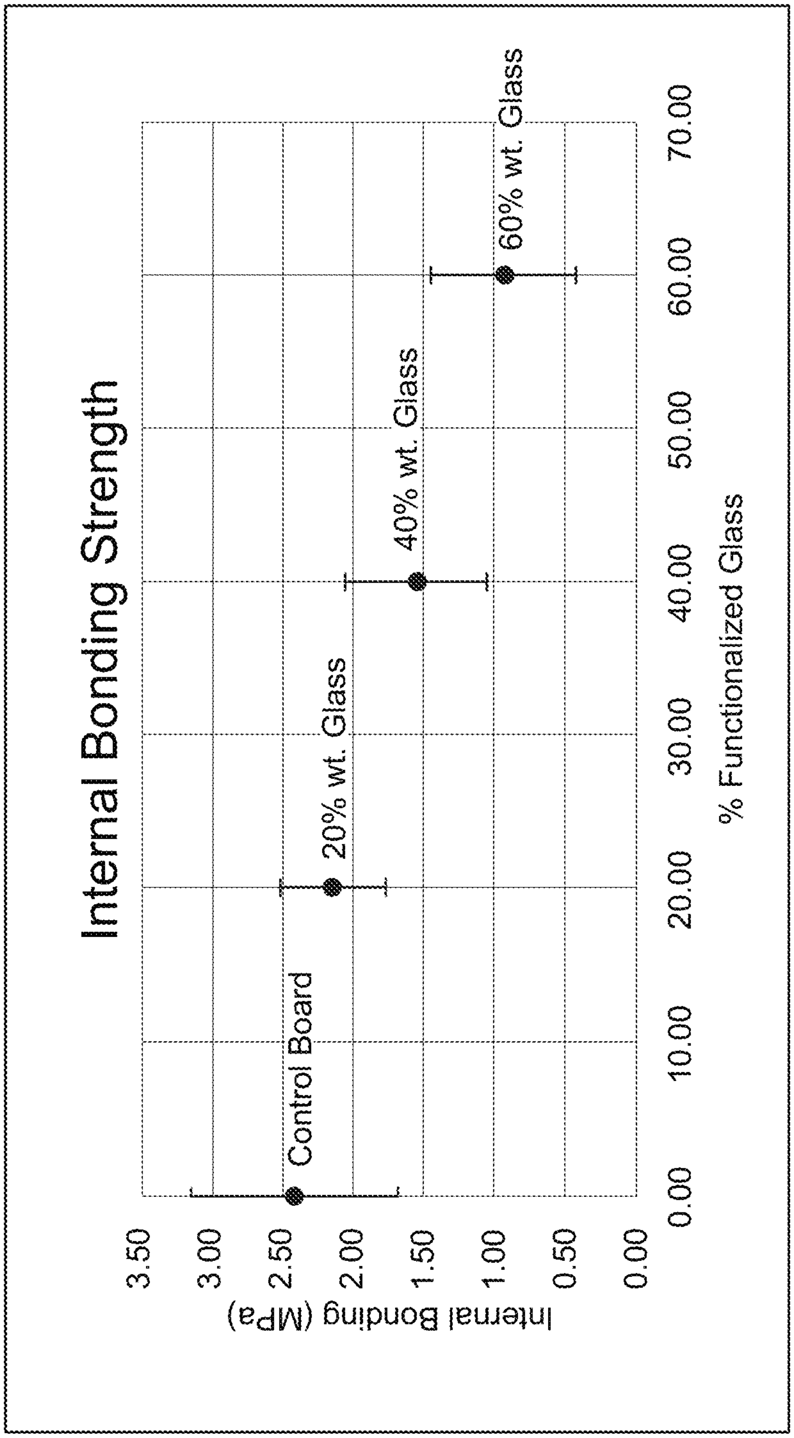
FIG. 22 shows the average of all types of shredded composite glass fibers for the key properties of the final boards with different loading levels (i.e., 0%, 20%, 40%, and 60% wt.)
Figure 22:
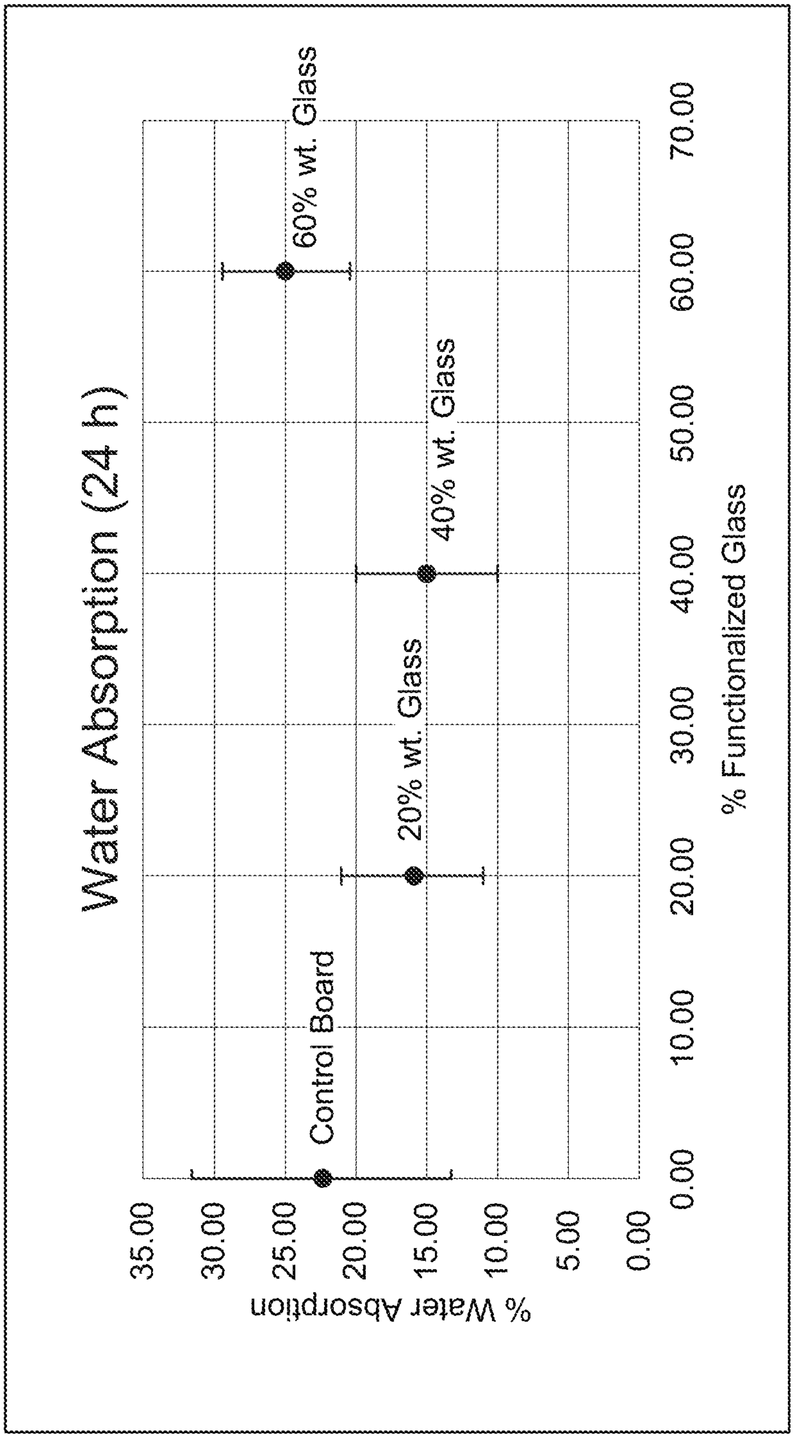
Figure 22:
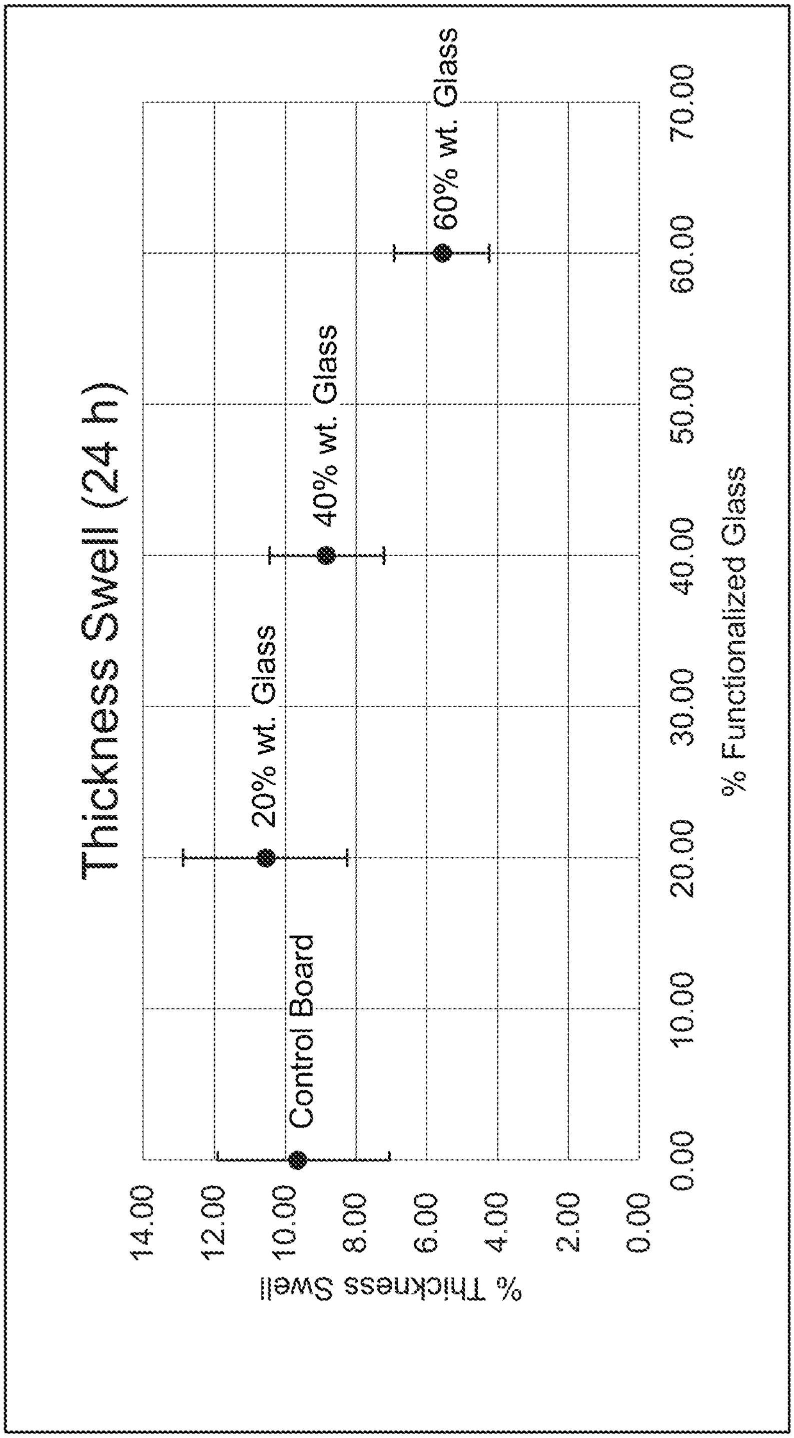
Figure 22:
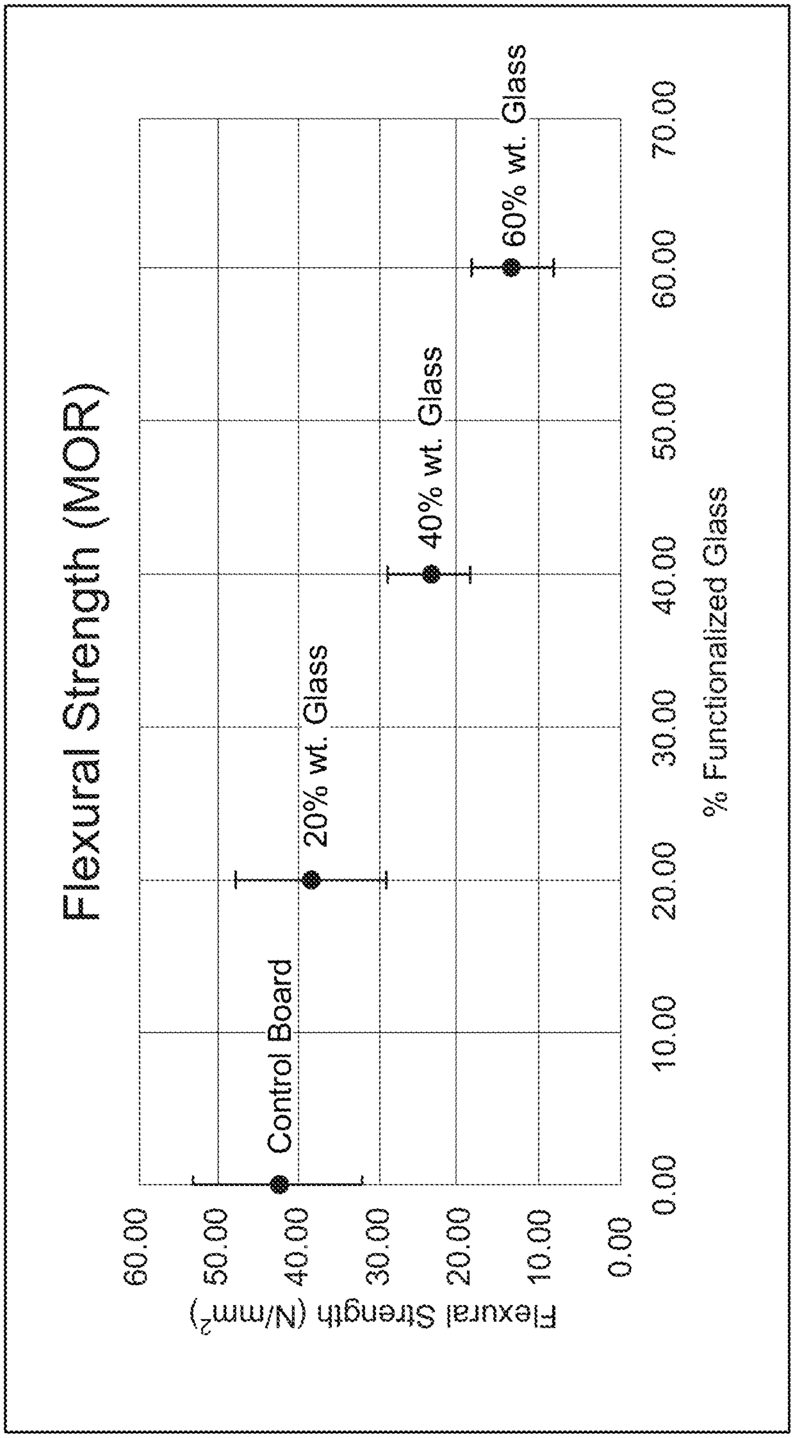
Figure 22:
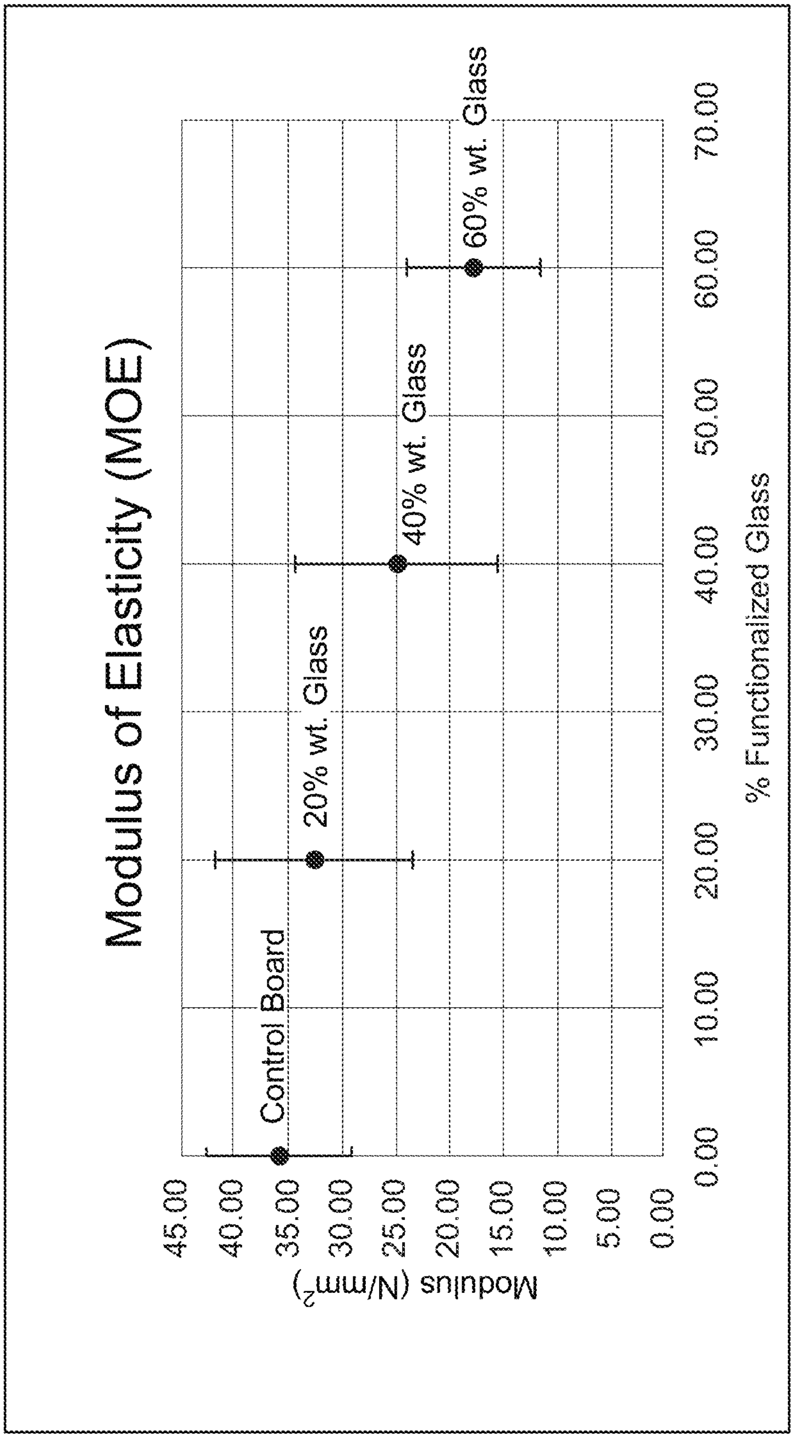

FIG. 22 provides an average of all data points for shredded composite glass in both wet and dry conditions, for different formulations (0%, 20%, 40%, and 60% wt. glass loading, while all other parameters are identical). Key properties of the finished products (internal bonding, moisture resistance, and flexural strength) are provided for these setpoints, suggesting 20%-40% wt. as the ideal range for adding fiberglass to the engineered wood fiberboard.

Figure 23:
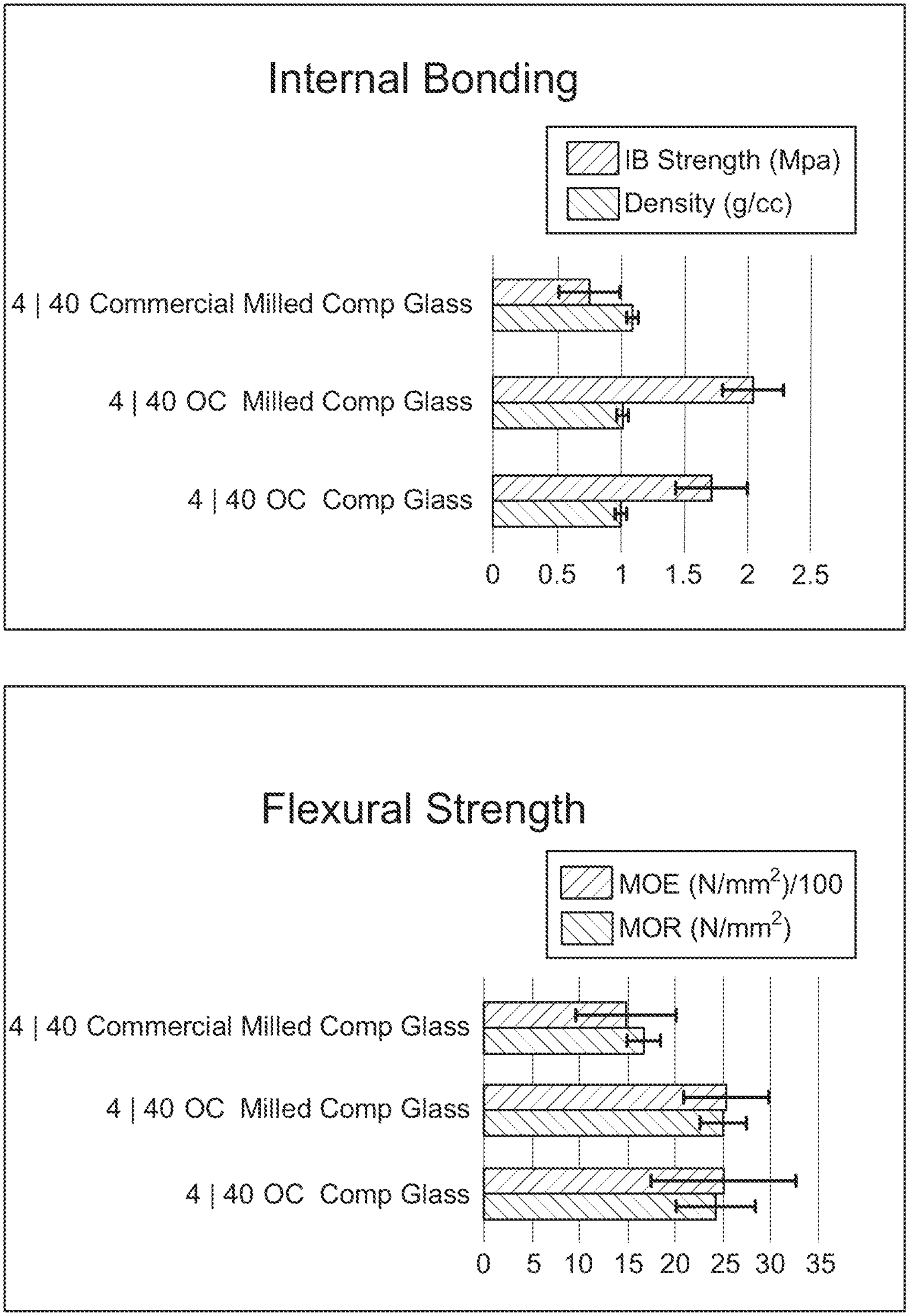
FIG. 23 shows internal bonding and flexural strength for different types of milled composite glass. Due to outstanding fiber strength of the composite glass fibers, there is a clear improvement in mechanical properties of the final product (comparing our product to two types of commercial milled fiberglass).

Commercial milled composite glass fiber from two different suppliers were obtained, and boards were made under identical preparation steps. Significant improvement in key properties is evident by using Owens Corning processed glass type, even when the milled composite glass fiber is compared to other commercial milled composite glass (FIG. 23).

Water Absorption:

FIGS. 15 and 22 show the results of 24-hour water soak test. Comparing the composite engineered wood boards to the control board, addition of glass fiber improves moisture resistance: lower thickness swelling and water absorption values (up to 30% for certain formulations and glass types). Due to the higher density of glass fiber relative to wood fiber, increasing the ratio of glass fiber at a set final density, is also equivalent to higher void content. It is believed that higher void content at the same density is the reason why water absorption ramps up when the glass ratio exceeds a certain level (FIG. 22, water absorption at 40% and 60% wt. of glass fibers). Please note that the properties of the control boards are also superior to the commercial samples obtained from a local store and tested internally.

Internal Bonding:

FIGS. 14 and 22 show the results of internal bonding strength testing for the engineered wood boards relative to the control board. As can be seen, the internal bonding of the fiberboard is generally maintained upon addition of 20% glass fibers (by weight). The exceptions include the 5-micron and 11-micron diameter insulation glass. The dramatic drop in internal bonding strength at 60% loading is due to having an overall less compliant and consistent matrix at that high of a ratio of glass fibers. It should be noted that the properties of the control boards are also superior to the commercial samples obtained from a local store and tested internally.

Flexural Strength:

FIGS. 16 and 22 show the results of flexural strength testing. The measurements are reduced upon addition of the fiberglass at various levels, regardless of the specs of the glass fibers used. Increasing the ratio of glass fibers decreases the flexural strength as a more brittle engineered wood product is obtained in higher ratios. Combining this plot with the previous plots, up to 20% wt. loading of glass fibers can allow for improvements in some other features without a significant drop in flexural strength (less than 10% drop in MOE and MOR values).

Figure 24:
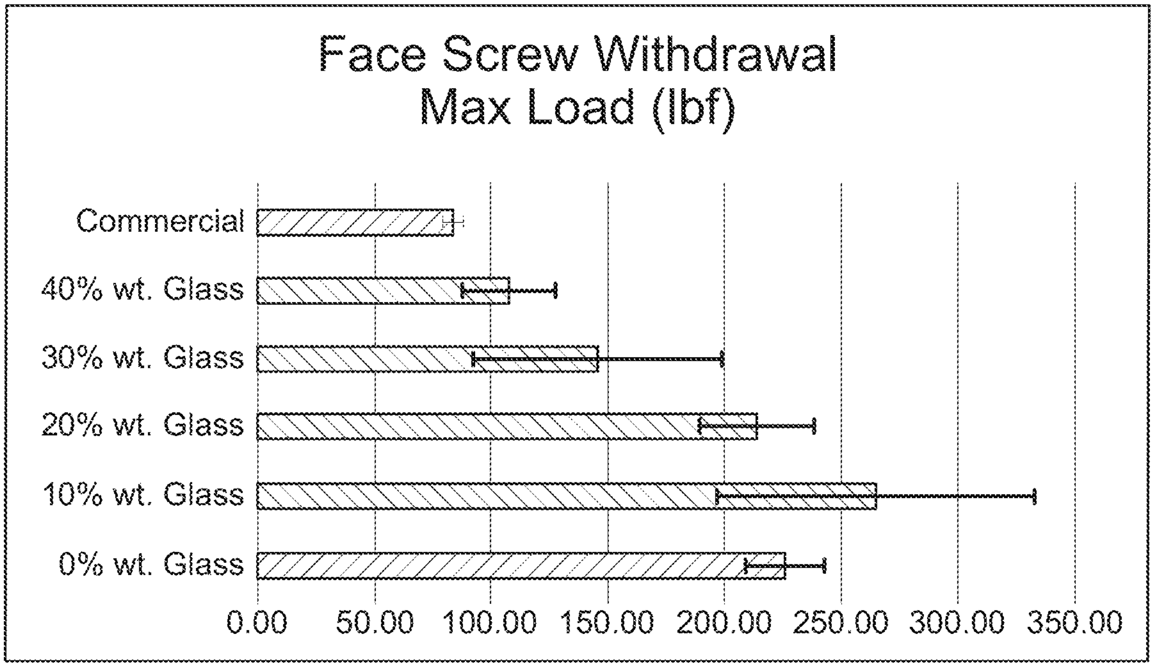
FIG. 24 shows results of a face screw withdrawal test performed on engineered wood boards with varying amounts of fiberglass addition.

Face Screw Withdrawal:

FIG. 24: similar to flexural strength, the addition of glass fibers reduces the face screw withdrawal value. Board samples were cut to nominally 4"×4" sizes for testing and a centrally located lead hole was drilled using a #19 drill bit. The fasteners used for testing were #10×2" wood screws. Each specimen had a screw installed to full thread engagement prior to test. The specimens were restrained on an INSTRON UTM (ICN: 005740) equipped with a 10 kn load cell (ICN: 005965) and operating at a rate of 0.06 in./min until thread withdrawal occurred.

Figure 25:
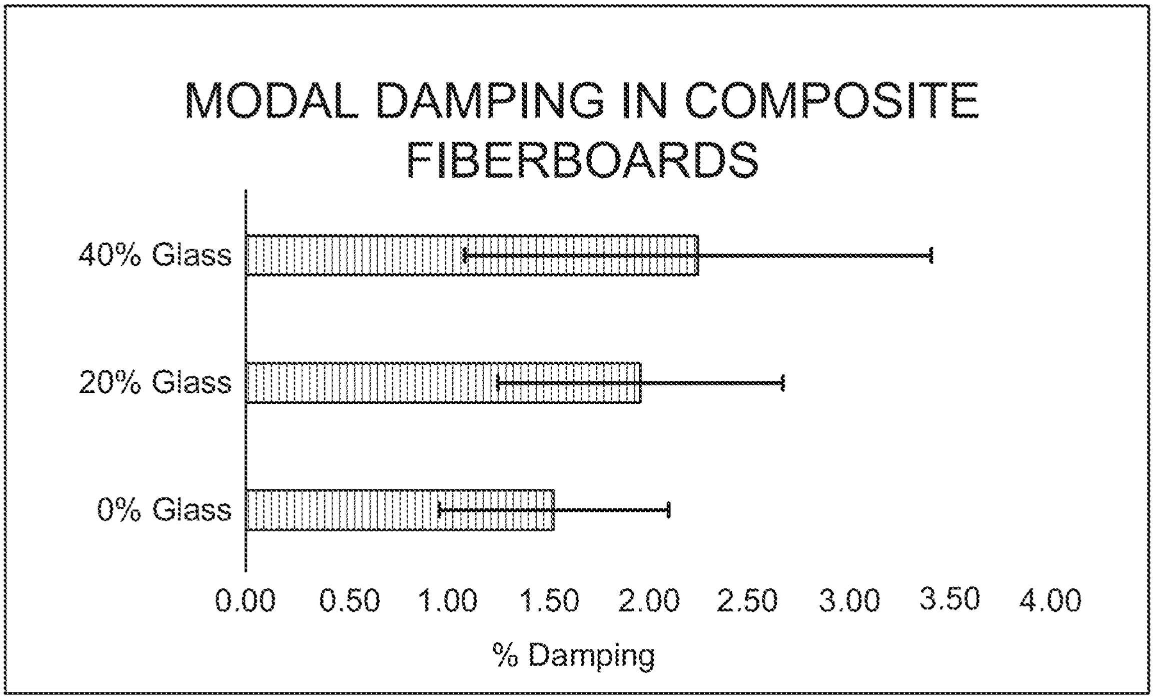
FIG. 25 shows results of acoustic dampening in engineered wood boards.

Acoustic Damping:

FIG. 25 shows that addition of glass fibers improves the acoustic damping in the final product. The increased standard deviation in higher ratios of glass fibers suggests that there is a need for a better customized test to investigate acoustic damping among samples. The samples were tested according to the following: Hang sample on resilient mount, Attach accelerometer 2" up and 2" over from lower left corner of sample, Strike sample in center with impact hammer, Record the H1 transfer function using Pulse® software, Select resonant modes and determine modal damping)

Figure 26:
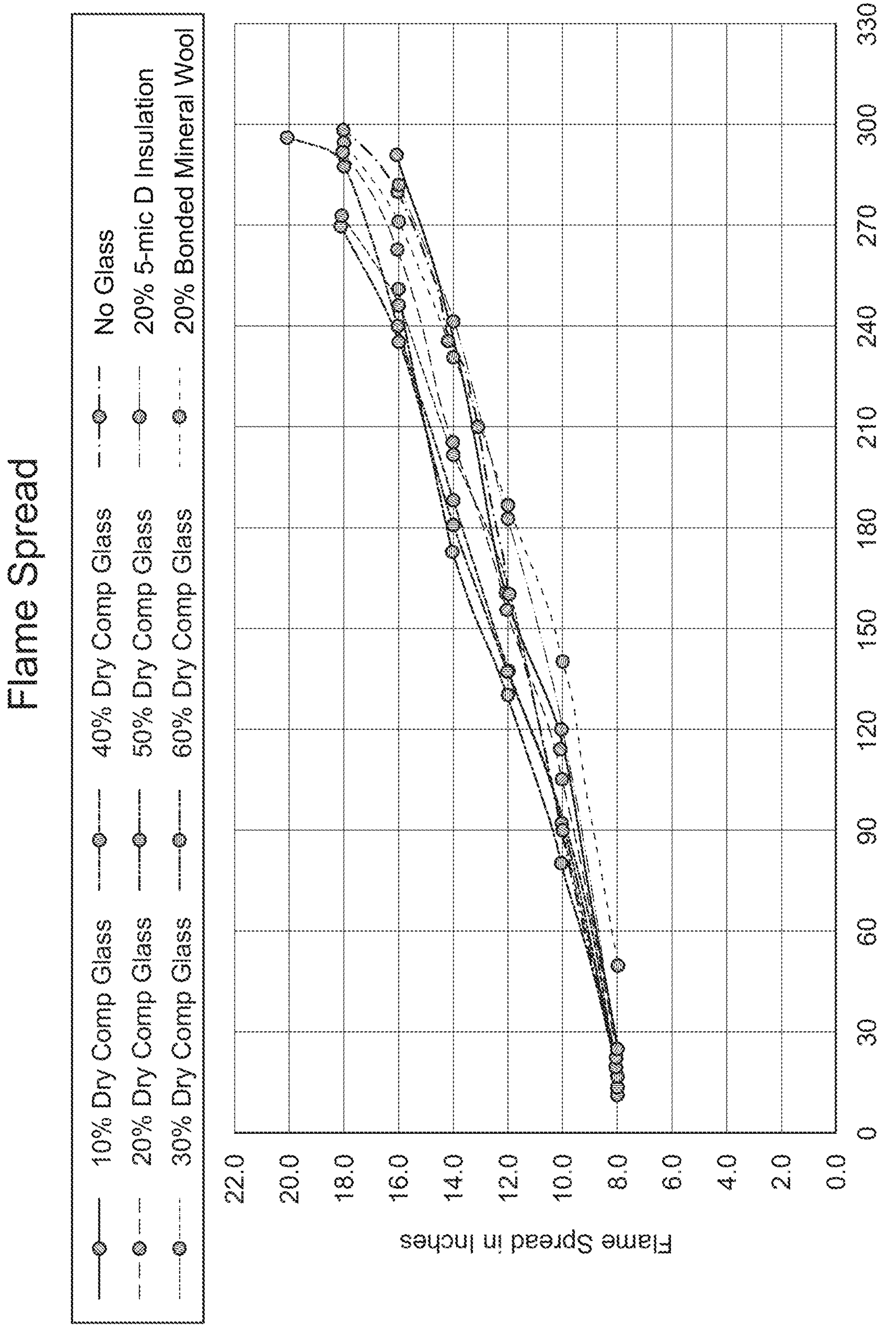
FIG. 26 shows results of flame spread and smoke change test using engineered wood boards including varying ratios of fiberglass and type of the fiberglass. Up to 20% wt. fiberglass loading, the flame-spread is reduced in the first ~2 minute of the experiment. Smoke is less in case of 10 and 20% of composite glass, and 20% of bonded mineral wool.
Figure 26:
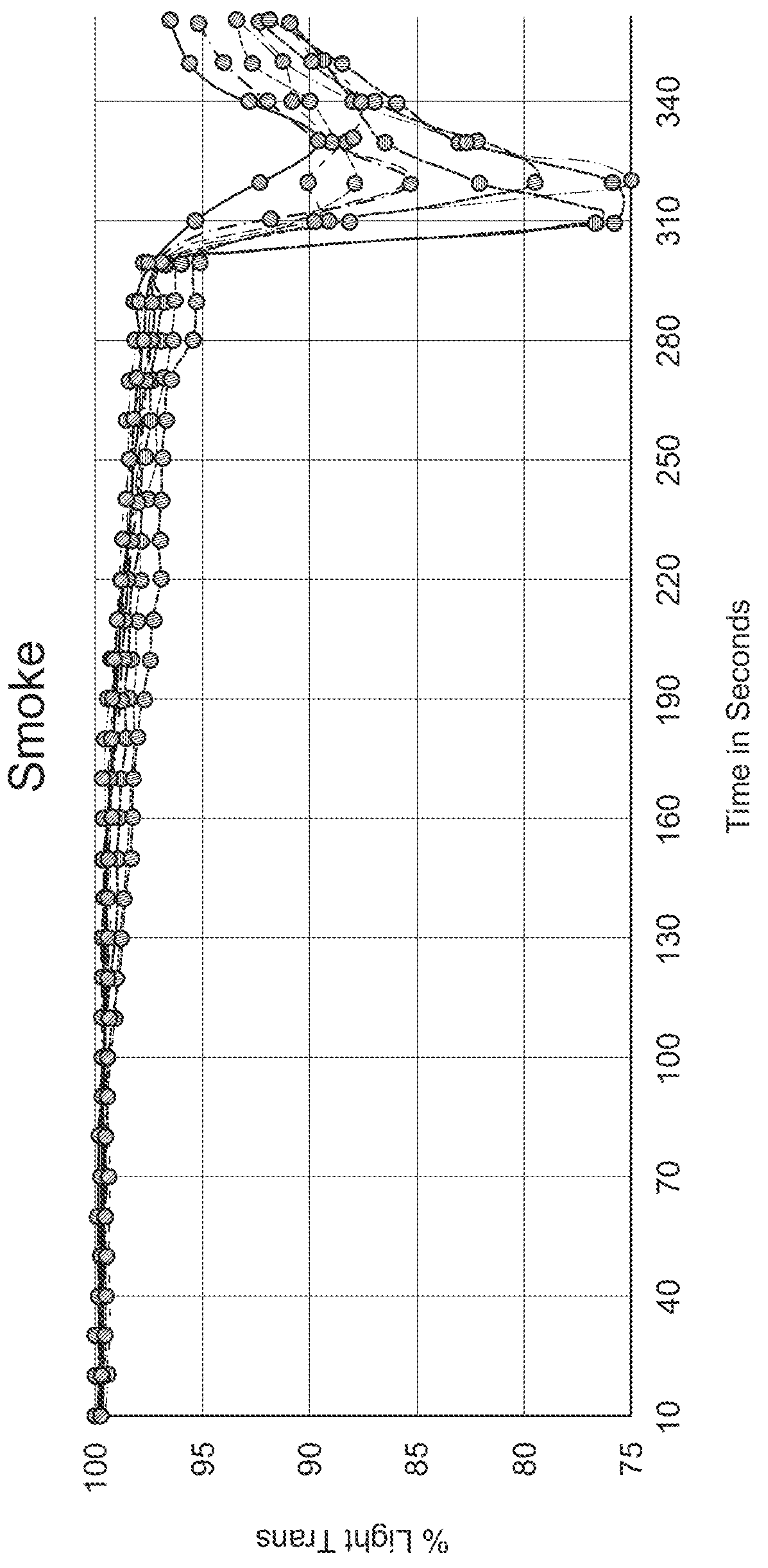

Fire Resistance:

A series of engineered wood product boards comprising 20% wt., 40% wt., and 60% wt. shredded composite glass were tested for fire resistance via simple flame test (FIG. 26). Except for 60% wt. glass, the samples burned until the fire was actively extinguished. However, the flame spread was much more limited in all the engineered wood boards relative to control. There was also clearly more charring in engineered wood boards, which should have caused the reduced flame-spread and flame size. In case of 60% wt. glass, the flame did not last, and went off after a few seconds automatically. This is without using any fire-retardant chemicals whatsoever. Another version of fire test was performed as a small scale tunnel test, where the length of flame spread as well as smoke emission were monitored for different ratios of composite glass (0, 10, 20, 30, 40, 50, and 60% wt.), as well as 5-micron insulation glass and mineral wool at 20% wt. loading. Up to 20% loading of fiberglass, the flame spread seems to be more limited for the first 1-2 minutes of the experiment. This is more evident with insulation glass and mineral wool, suggesting better fire resistance properties with these two types versus composite glass.

Example 6: a series of engineered wood product boards were made using 40% glass and 56% wood and 4% binder, according to the following procedure: 1—Glass fiber is added to the wood fiber, and mixed in a blender with enough turbulence to mix and distribute the fibers. 2—Resin is sprayed onto the mixture and the final mixture is further blended for better uniformity. 3—The mixture is cold pressed using a plunger and a box, transferred to a daylight press, and finally pressed under heat (approx. 445° F.) to cure the mixture to a cohesive board.

The boards were then scanned using a Zeiss EVO50 scanning electron microscope. All samples were imaged at 200× to determine the amount of wood, glass, and void in each board. The average fiber diameter of the glass fibers was also determined.

Example 7: a series of engineered wood boards were produced using 4% by weight resin (pMDI), 20-60% by weight shredded glass, with the remainder being wood fiber. Control boards (which only have wood fiber and resin) were also produced. Commercial MDF/HDF samples were purchased from a local store (exact formulation is not known). Nevertheless, they are used as an overall control (regarding the average properties and the standard deviation using our exact same internal testing methods).

ULF (unbonded loosefill) is a type of insulation glass with an average diameter of 4-5 micron, and does not perform well relative the control board and the other types of glass herein (wet, dry and dust). This shows the dependence of the properties to the specifications of the glass incorporated in the fiberboard.

Fire Resistance:

A series of engineered wood product boards comprising 20% wt. glass, 40% wt. glass, and 60% wt. glass were tested for fire resistance. Except for 60% wt. glass, the samples burned until the fire was actively extinguished. However, the flame spread was much more limited in all the engineered wood boards relative to control. There was also clearly more charring in engineered boards, which should have caused the reduced flame-spread and flame size. In case of 60% wt. glass, the flame did not last, and went off after a few seconds automatically. This is without using any fire-retardant chemicals whatsoever.

Example 8: determining efficient mixing of wood fiber and glass fiber. A blender with built-in inlets that would allow blowing air inside the blender to create a whirlwind that yields a high-quality mix similar to what happens in the blow-line in a manufacturing facility was employed. The blades of the mixer provide extra chopping and breaking down of both wood fiber and glass fiber, where the created turbulence/whirlwind allows for a uniform mixture throughout the batch.

Since pMDI is used in these example products, wood fiber is conditioned to about 15% moisture level prior to mixing (simply by spraying water on layers of wood fiber, and storing it in capped buckets). NCO groups of pMDI produce amine upon reaction with water, which then reacts with another NCO group, allowing the resin to cure.

In different formulations, 10%, 20%, or 30% (by weight) replacement of wood fiber with fiberglass was targeted. To account for the compressibility of the wood, different empirical trials were run to come up with a correction factor that would allow for obtaining the right density considering the dimensions of the board (8"× 8"× 0.25"). Typically, conditioned wood and glass are mixed for 10 seconds, hit with one spray of pMDI, mixed for another 10 second before hitting the second spray of pMDI, and then mixed for one full minute in the blender. As discussed previously, a paint sprayer was used to atomize the resin and efficiently spray that onto the mixture. The mixture (30-40 grams for each portion), is then divided into two, and each half was run for another minute to ensure good uniformity. Prior to forming the engineered wood product.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of “1 to 10” should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The engineered wood products and corresponding manufacturing methods of the present disclosure can comprise, consist of, or consist essentially of the essential elements and limitations of the disclosure as described herein, as well as any additional or optional ingredients, components, or limitations described herein or otherwise useful in fiberglass composition applications.

The engineered wood products of the present disclosure may also be substantially free of any optional or selected essential ingredient or feature described herein, provided that the remaining engineered wood composition still contains all of the required ingredients or features as described herein. In this context, and unless otherwise specified, the term “substantially free” means that the selected composition contains less than a functional amount of the optional ingredient, typically less than 0.1% by weight, and also including zero percent by weight of such optional or selected essential ingredient.

To the extent that the terms “include,” “includes,” or “including” are used in the specification or the claims, they are intended to be inclusive in a manner similar to the term “comprising” as that term is interpreted when employed as a transitional word in a claim. Furthermore, to the extent that the term “or” is employed (e.g., A or B), it is intended to mean “A or B or both A and B.” When the Applicant intends to indicate “only A or B but not both,” then the term “only A or B but not both” will be employed. Thus, use of the term “or” herein is the inclusive, and not the exclusive use. In the present disclosure, the words “a” or “an” are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A method of making an engineered wood product, the method comprising:

mixing glass fibers, wood fibers, and a resin to form a fibrous mixture;

wherein the glass fibers and wood fibers comprise 80% to 98% by weight of the fibrous mixture, and glass fibers make up 1% to 60% of the total weight of glass fibers and wood fibers;

wherein the resin is selected from a urea-formaldehyde binder present in an amount of 5% to 20% by weight of the fibrous mixture and a MDI binder present in an amount of 2% to 7% by weight of the fibrous mixture;

forming the fibrous mixture into a desired shape; and curing the resin to form an engineered wood product.

2. The method of claim 1, wherein the curing step comprises at least one of heating the fibrous mixture and applying pressure to the fibrous mixture.

3. The method of claim 1, wherein curing comprises both heating the fibrous mixture and applying pressure to the fibrous mixture.

4. The method of claim 1, wherein the mixture is heated while pressure is applied.

5. The method of claim 1, wherein the glass fibers are shredded prior to mixing.

6. The method of claim 1, wherein mixing comprises mixing wood fibers and glass fibers prior to adding the resin to the mixture.

7. The method of claim 1, wherein mixing comprises mixing wood fibers and the resin prior to adding the glass fibers to the mixture.

8. The method of claim 1, wherein the resin is a urea-formaldehyde binder and is present in an amount of 5% to 20% by weight of the engineered wood product.

9. The method of claim 1, wherein the resin is a MDI binder and is present in an amount of 2% to 7% by weight of the engineered wood product.

10. The method of claim 1, wherein the glass fibers are present in an amount of 4% to 50% by weight of the fibrous mixture.

11. The method of claim 10, wherein the glass fibers and wood fibers are mixed by a combination of mechanical means and directed air.

12. The method of claim 1, wherein the glass fibers have an average diameter of 0.5microns to 350 microns.

13. The method of claim 1, wherein the glass fibers have an average length of 2microns to 25 millimeters.

14. The method of claim 1, wherein the engineered wood product is in the form of a high-density board.

* * * * *